United States Patent
Eguchi

[11] Patent Number: 5,996,416
[45] Date of Patent: Dec. 7, 1999

[54] SEISMOMETER

[75] Inventor: Takao Eguchi, Tsukuba, Japan

[73] Assignee: Science and Technology Agency National Research Institute for Earch Science and Disaster Prevention, Tsukuba, Japan

[21] Appl. No.: 09/021,415

[22] Filed: Feb. 10, 1998

[30]     Foreign Application Priority Data

Feb. 28, 1997 [JP] Japan .................................. 9-060153

[51] Int. Cl.$^6$ .............................. G01D 5/32; G01V 8/00
[52] U.S. Cl. ............................................. 73/655; 73/1.85
[58] Field of Search ........................... 73/649, 653, 655, 73/657, 705, 1.41, 1.85; 367/141, 149; 356/345, 360, 149; 250/227.19, 231.1

[56]              References Cited

U.S. PATENT DOCUMENTS

| | | | |
|---|---|---|---|
| 4,613,752 | 9/1986 | Davis | ................................. 250/227 |
| 4,893,930 | 1/1990 | Garrett et al. | ........................... 356/345 |
| 4,951,271 | 8/1990 | Garrett et al. | ........................... 367/141 |
| 4,959,539 | 9/1990 | Hofler et al. | ....................... 250/227.19 |

*Primary Examiner*—Hezron Williams
*Assistant Examiner*—Helen C. Kwok
*Attorney, Agent, or Firm*—Armstrong, Westerman, Hattori, McLeland & Naughton

[57]                 ABSTRACT

A two- or three-component measuring accelerometer based on an operating principle entirely different from that of conventional accelerometers is realized with a simple arrangement and provided as a two- or three-component measuring seismometer. Planar optical fiber rolls (2) whose light propagation characteristics change sensitively in response to changes in the pressure applied thereto are split into more than three separate sections and disposed at the bottom of a columnar or polygonal prism-shaped load member (1). Changes in acceleration acting on the load member (1) are measured on the basis of differences between the light propagation characteristics of the split optical fiber rolls (2-1 to 2-4).

8 Claims, 19 Drawing Sheets

SEISMOMETER

BACKGROUND OF THE INVENTION

1. Field of the Invention

The present invention relates to a three-component measuring seismometer having an accelerometer that measures accelerations due to earthquake motion by using planar optical fiber rolls whose light propagation characteristics change sensitively in response to changes in pressure applied thereto.

The present invention also relates to a seismometer that detects accelerations in the directions of two orthogonal horizontal axes and in the vertical direction. The seismometer has load members displaceable relative to each other, and stacks of force sensors disposed in the gaps between the load members. Each force sensor has an optical fiber roll whose light propagation characteristics change in response to changes in pressure applied thereto. The optical fiber roll is provided on a rigid plate.

2. Description of the Related Art

Incidentally, the accelerometer is a sensor that outputs signals proportional to acceleration components of ground motion inputted thereto during earthquake(s). The accelerometer has a pendulum acting as a steady point in a container. Therefore, even if the container moves together with ground motion, the accelerometer can output the acceleration components of the relative motion between the container and the pendulum acting as a steady point. In general, the output signal from the accelerometer consists of a total of three components, including one vertical component and two horizontal components.

Conventional accelerometers include a mechanical type and an electromagnetic type. Of the two types, the electromagnetic accelerometer is more widely used. In this type of accelerometer, an electromagnet is placed around a pendulum wound with a coil of copper wire. Accordingly, acceleration components of ground motion obtained from the pendulum are detected as electric signals. A servo accelerometer, which is a kind of electromagnetic accelerometer, measures accelerations with high accuracy by virtue of the arrangement that a rebalance electric current proportional to the displacement of the pendulum position caused by an input ground motion is $f_e$ d back to the pendulum coil to hold the pendulum in the vicinity of the position assumed when no ground motion is applied. To measure minute accelerations with high accuracy using these accelerometers, it is necessary to place the accelerometer on an attitude controller so as to hold it as nearly horizontal as possible.

The conventional accelerometers measure the acceleration components of the relative motion between the seismometer container and the pendulum acting as a steady point and generally require a costly attitude controller to measure minute accelerations with the conventional accelerometers. Further, signal outputs from the conventional accelerometers are analog signals.

Incidentally, it is conjectured that optical signals will be used as data transmission means not only for seismic observations at the bottom of the sea but also for those on land in the future. In the case of on-line seabottom seismic observation systems in particular, optical cables are used; therefore, the conventional accelerometers execute signal processing for each channel through an analog-to-digital signal converter (A/D converter) and then convert the resulting signal into an optical signal through an electric-to-optical signal converter and send out the signal through an optical cable.

The observation systems using the conventional accelerometers require a sensor control mechanism which locks the pendulum of the seismometer during transport and installation of the equipment to protect the observation sensor from shocks and sets the pendulum free under preferable observation conditions. The sensor control mechanism needs an optical-to-electric signal converter and a sensor control mechanism unit comprising a motor, etc. because control commands from a land station are sent by optical signals.

Therefore, in the conventional seabottom seismic observation systems using the above-described accelerometers, for example, the observation sensors must be formed using components of fairly high quality and reliability which are on the same levels as those of components of submarine repeaters used in long-life submarine communication cables. In addition, manufacturing of mechanical components requires a considerable degree of machining accuracy and hence a fairly high degree of skill.

There is an increasing tendency to transmit land seismic observation data by digital-only lines using optical cables. Therefore, there is an increasing demand for observation systems that do not need components such as A/D converters and electric-to-optical signal converters. The currently existing observation systems incorporating the conventional accelerometers still have a large number of components.

In general, the smaller the number of components, the higher the reliability of the observation system. For the reasons stated above, seabottom observation systems using the conventional accelerometers inevitably require a great deal of cost for the production, transportation and installation.

SUMMARY OF THE INVENTION

An object of the present invention is to provide a three-component measuring seismometer having an accelerometer based on an operating principle totally different from that of the conventional accelerometers and having a simple arrangement.

Another object of the present invention is to provide a two-component seismometer and a three-component seismometer, in which load members displaceable relative to each other are disposed to face opposite to each other, and stacks of force sensors are disposed in the gaps between the load members, each force sensor having an optical fiber roll whose light propagation characteristics change sensitively in response to a change in pressure applied thereto and which is provided on a rigid plate, thereby improving the detection sensitivity and enabling a servo function or a feedback function to be exhibited without adding a special member.

According to a first aspect of the present invention, there is provided a three-component seismometer including an accelerometer which has a columnar or polygonal prism-shaped load member and planar split optical fiber rolls whose light propagation characteristics change in response to a change in pressure applied thereto. The split optical fiber rolls are disposed at the bottom of the load member to measure a change in acceleration acting on the load member on the basis of a difference between the light propagation characteristics of the split optical fiber rolls.

According to a second aspect of the present invention, there is provided a three-component seismometer including a quadrangular prism-shaped load member and planar optical fiber rolls disposed under a predetermined pressure on the six surfaces, respectively, of the load member. The optical fiber rolls have light propagation characteristics which change in response to a change in pressure applied to the optical fiber rolls, so that a change in acceleration acting on the load member is measured on the basis of a difference between the light propagation characteristics of the optical fiber rolls.

According to a third aspect of the present invention, there is provided a two-component measuring seismometer including a hollow rectangular prism-shaped load member and a rectangular cylinder-shaped load member disposed inside the hollow rectangular prism-shaped load member with gaps therebetween. A solid rectangular prism-shaped load member is disposed inside the rectangular cylinder-shaped load member with gaps therebetween. Stacks of force sensors are respectively disposed in four gaps across which the hollow rectangular prism-shaped load member and the rectangular cylinder-shaped load member face opposite to each other and in four gaps which face opposite to the four gaps across the rectangular cylinder-shaped load member and across which the rectangular cylinder-shaped load member and the solid rectangular prism-shaped load member face opposite to each other. Each force sensor has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. The stacks of force sensors are positioned to face toward four directions, respectively, of two orthogonal horizontal (X and Y) axes. A data processing unit calculates acceleration applied in a direction of displacement of the solid rectangular prism-shaped load member on the basis of a difference between two phase difference outputs, one of which is obtained by determining a phase difference between reference light and composite phase-shifted light obtained by averaging output light from the optical fiber rolls of the force sensors provided for one direction of one of the two orthogonal horizontal (X and Y) axes along which the load members are displaced relative to each other at the exit side of the optical fiber rolls. The other of the two phase difference outputs is obtained by determining a phase difference between the reference light and composite phase-shifted light obtained by averaging output light from the optical fiber rolls of the force sensors provided for the other direction of the one of the two (X and Y) axes at the exit side of the optical fiber rolls.

According to a fourth aspect of the present invention, there is provided a three-component measuring seismometer including a hollow rectangular prism-shaped load member and a solid rectangular prism-shaped load member disposed inside the hollow rectangular prism-shaped load member with gaps therebetween. Stacks of force sensors are respectively disposed in six gaps across which the hollow rectangular prism-shaped load member and the solid rectangular prism-shaped load member face opposite to each other. Each force sensor has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. The stacks of force sensors are positioned to face toward six directions, respectively, i.e. four directions of two horizontal (X and Y) axes and two directions of a vertical (Z) axis of an orthogonal coordinate system. A data processing unit calculates acceleration applied in a direction of displacement of the solid rectangular prism-shaped load member on the basis of a difference between two phase difference outputs, one of which is obtained by determining a phase difference between reference light and composite phase-shifted light obtained by averaging output light from the optical fiber rolls of the force sensors provided for one direction of one of the three (X, Y and Z) axes along which the load members are displaced relative to each other at the exit side of the optical fiber rolls. The other of the two phase difference outputs is obtained by determining a phase difference between the reference light and composite phase-shifted light obtained by averaging output light from the optical fiber rolls of the force sensors provided for the other direction of the one of the three (X, Y and Z) axes at the exit side of the optical fiber rolls.

According to a fifth aspect of the present invention, there is provided a three-component measuring seismometer including a Z-direction accelerometer disposed such that two ends thereof face toward two opposite directions of a vertical (Z) axis of an orthogonal coordinate system having mutually perpendicular X-, Y- and Z-axes. The Z-direction accelerometer has a hollow rectangular prism-shaped load member and a solid rectangular prism-shaped load member disposed in the internal space of the hollow rectangular prism-shaped load member so as to be displaceable in a vertical longitudinal axis direction. The Z-direction accelerometer further has a stack of force sensors disposed to face each of two end surfaces in the displaceable direction of the solid rectangular prism-shaped load member. Each force sensor has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. The seismometer further includes a pair of X-direction accelerometers for detecting acceleration in a horizontal X-axis direction. The X-direction accelerometers are disposed along a pair of opposite outer peripheral surfaces, respectively, of the Z-direction accelerometer to extend in the X-axis direction. Each X-direction accelerometer has a hollow rectangular prism-shaped load member and a solid rectangular prism-shaped load member disposed in the internal space of the hollow rectangular prism-shaped load member so as to be displaceable in a horizontal longitudinal axis direction. Each X-direction accelerometers further has a stack of force sensors disposed to face each of two end surfaces in the displaceable direction of the solid rectangular prism-shaped load member. Each force sensor has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. The seismometer further includes a pair of Y-direction accelerometers for detecting acceleration in a horizontal Y-axis direction. The Y-direction accelerometers are disposed along a pair of opposite outer peripheral surfaces, respectively, of the Z-direction accelerometer to extend in the Y-axis direction. Each Y-direction accelerometer has a hollow rectangular prism-shaped load member and a solid rectangular prism-shaped load member disposed in the internal space of the hollow rectangular prism-shaped load member so as to be displaceable in a horizontal longitudinal axis direction. Each Y-direction accelerometer further has a stack of force sensors disposed to face each of two end surfaces in the displaceable direction of the solid rectangular prism-shaped load member. Each force sensor has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. The seismometer further includes a data processing unit that calculates acceleration applied in the X-axis direction on the basis of a difference between two phase difference outputs, one of which is obtained by determining a phase difference between reference light and a recomposed value obtained by averaging two composite phase-shifted light each obtained by averaging output light from the optical fiber rolls of the force sensors provided to face one end surface of the solid rectangular prism-shaped load member of each of the pair of X-direction accelerometers at the exit side of the optical fiber rolls. The other of the two phase difference outputs is obtained by determining a phase difference between the reference light and a recomposed value obtained by averaging two composite phase-shifted light each obtained by averaging output light from the optical fiber rolls of the force sensors provided to face the other end surface of the solid rectangular prism-shaped load member of each of the pair of X-direction accelerometers at the exit side of the optical fiber rolls. The data processing unit further calculates acceleration applied in the Y-axis direction on the basis of a difference between two phase difference outputs, one of which is obtained by determining a phase difference between the reference light and a recomposed value obtained by averaging two composite phase-shifted light each obtained by averaging output light from the optical fiber rolls of the force sensors provided to face one end surface of the solid rectangular prism-shaped load member of each of the pair of Y-direction accelerometers at the exit side of the optical fiber rolls. The other of the two phase difference outputs is obtained by determining a phase difference between the reference light and a recomposed value obtained by averaging two composite phase-shifted light each obtained by averaging output light from the optical fiber rolls of the force sensors provided to face the other end surface of the solid rectangular prism-shaped load member of each of the pair of Y-direction accelerometers at the exit side of the optical fiber rolls. The data processing unit further calculates acceleration applied in the Z-axis direction on the basis of a difference between two phase difference outputs each obtained by determining a phase difference between the reference light and composite phase-shifted light obtained by averaging output light from the optical fiber rolls of the force sensors provided to face each of the two end surfaces of the solid rectangular prism-shaped load member in the Z-direction accelerometer at the exit side of the optical fiber rolls.

According to a sixth aspect of the present invention, the seismometer according to the fourth or fifth aspect of the present invention is accommodated in a container disposed at the bottom of a borehole dug in the ground, thereby eliminating the effect of temperature changes on the optical fiber rolls in the container.

According to a seventh aspect of the present invention, the seismometer according to any one of the third to fifth aspects of the present invention is arranged such that the meandrous optical fiber roll is immersed in a viscous liquid filled in a bag member, so that when a pressure is externally applied toward the optical fiber roll through the bag member, the viscous liquid in the bag member applies uniform normal stress to the outer peripheral surface of the optical fiber roll while maintaining a hydrostatic pressure without applying (dynamic) shear stresses to the optical fiber roll, thereby uniformly reducing the sectional area of the optical fiber roll and converting a change in the applied pressure into a change in the axial length of the optical fiber roll.

According to an eighth aspect of the present invention, the seismometer according to any one of the third to fifth aspects of the present invention is arranged such that the meandrous optical fiber roll is immersed in a viscous liquid filled in a bag member, so that when a pressure is externally applied toward the optical fiber roll through the bag member, the viscous liquid in the bag member applies only uniform normal stress to the outer peripheral surface of the optical fiber roll while maintaining a hydrostatic pressure without applying (dynamic) shear stresses to the optical fiber roll, thereby uniformly reducing the sectional area of the optical fiber roll and converting a change in the applied pressure into a change in the axial length of the optical fiber roll. The optical fiber roll is defined as an optical fiber roll for measurement, and an optical fiber roll through which the reference light passes is accommodated in a rigid tubular member to form a reference optical fiber roll. The optical fiber roll for measurement and the reference optical fiber roll are paired and provided on the rigid plate in a side-by-side relation to each other.

According to the first aspect of the present invention, planar optical fiber rolls whose light propagation characteristics change sensitively in response to a change in pressure applied thereto are split and disposed at the bottom of a columnar or polygonal prism-shaped load member to measure a change in acceleration acting on the load member on the basis of a difference between the light propagation characteristics of the split optical fiber rolls. Accordingly, it is possible to realize an accelerometer based on an operating principle entirely different from that of the conventional accelerometers. Moreover, the acceleration measuring accuracy can be improved with a simple arrangement. In addition, the measured value can be corrected by each pressure component at the time of installation. Alternatively, the measured value can be corrected by phase comparison with the immediately previous output light. Therefore, leveling is unnecessary, and it is only necessary to orient the accelerometer in the correct direction. Accordingly, the accelerometer is easy to install.

According to the second aspect of the present invention, planar optical fiber rolls are disposed under a predetermined pressure on the six surfaces, respectively, of a quadrangular prism-shaped load member to measure a change in acceleration acting on the load member on the basis of a difference between the light propagation characteristics of the optical fiber rolls. Therefore, the load member is displaced rectilinearly in the north, south, east and west directions and also in the vertically upward and downward directions to measure acceleration, but does not tilt forward nor backward as the load member according to the first aspect of the present invention does.

According to the third and fourth aspects of the present invention, stacks of force sensors are disposed in gaps formed between load members which are displaceable relative to each other. Each of the force sensors has a circular cylinder-shaped or meandrous optical fiber roll provided on a rigid plate. The optical fiber roll has light propagation characteristics which change in response to a change in pressure applied thereto, which is caused by relative displacement between the load members due to application of acceleration, thus causing the phase of light transmitted through the optical fiber roll to be shifted. The optical fiber roll has a smaller elastic constant than those of the load members and the rigid plate. Moreover, phase-shifted light from the optical fiber rolls of the force sensors provided for each of two opposite sites of an axis along which the load members are displaced relative to each other are averaged at the exit side of the optical fiber rolls to output composite phase-shifted light. Therefore, even if a force sensor inferior in detection sensitivity is present among the stacked force sensors, deterioration of the detection sensitivity is corrected by averaging of the detection outputs from (many) other healthy force sensors. Accordingly, it is possible to improve the detection sensitivity, and thus measuring accuracy can be improved. Moreover, when acceleration is applied, each rigid plate is also displaced rapidly in addition to the load members, thus causing the pressure from the load members and the pressure from each rigid plate to be applied to each of the stacked circular cylinder-shaped optical fiber rolls. Accordingly, the applied acceleration can be surely transmitted and applied to each optical fiber roll. Thus, an acceleration signal can be surely generated from each force sensor.

Further, because the optical fiber rolls have elasticity and each formed in a circular cylinder shape, the optical fiber rolls function as spring members between the load members and the rigid plates in the seismometer. Therefore, the displacement of the load members and the rigid plates can be stopped at a position where the spring force balances with the pressure produced by the displacement of the load members and the rigid plates. Accordingly, the optical fiber rolls can function as members having apparently a servo function, and this function can be realized without adding a special component.

Further, because the optical fiber rolls have elasticity which enable them to function as spring members as stated above, the optical fiber rolls themselves can behave as an elastic material between the load members and the rigid plates. Accordingly, the force sensors can be disposed without producing any play with respect to the load members and the rigid plates.

According to the fifth aspect of the present invention, it is possible to obtain the same advantageous effects as those obtained by the seismometers according to the third and fourth aspects of the present invention. In addition, a recomposed value is obtained by averaging two composite phase-shifted light which are obtained by averaging the outputs from the optical fiber rolls in a pair of X-direction accelerometers, respectively, and a recomposed value is obtained by averaging two composite phase-shifted light which are obtained by averaging the outputs from the optical fiber rolls in a pair of Y-direction accelerometers, respectively. Accordingly, the outputs from the optical fiber rolls are averaged to improve the reliability even more effectively.

According to the sixth aspect of the present invention, the three-component seismometer using optical fiber sensors is accommodated in a container installed in a borehole dug in the ground, thereby maintaining the ambient temperature of the optical fiber rolls in the container at a constant and uniform level. Thus, it is possible to prevent occurrence of measuring errors due to temperature changes.

According to the seventh aspect of the present invention, the meandrous optical fiber roll is immersed in a viscous liquid filled in a bag member, so that when an external pressure is applied, a hydrostatic pressure is applied to the optical fiber roll without applying shear stresses thereto. Thus, normal stress is uniformly applied to the outer peripheral surface of the optical fiber roll, thereby uniformly reducing the sectional area of the optical fiber roll and converting a change in the applied pressure into a change in the axial length of the optical fiber roll. Therefore, phase shifts can be measured smoothly.

According to the eighth aspect of the present invention, an optical fiber roll for measurement and an optical fiber roll for reference are provided on the same rigid plate in a side-by-side relation to each other. Accordingly, the two optical fiber rolls are placed under the same atmospheric conditions. Therefore, the measuring accuracy can be improved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(A) and 1(B) are diagrams showing a first embodiment of a three-component seismometer according to the present invention, in which FIG. 1(A) is a front view of a three-component accelerometer, and FIG. 1(B) is a plan view of optical fiber rolls which are split and disposed in a ring shape.

FIGS. 2(A) to 2(D) are diagrams showing the way in which pressure components are produced in a load member (1) when an external force is applied thereto, in which:

FIG. 2(A) shows the way in which a pressure component is produced by a change of torque (turning moment) due to force acting horizontally on the center of gravity G of the load member;

FIG. 2(B) shows the way in which a shear stress of uniform magnitude is produced within the optical fiber rolls (2-2, 2-4) by force acting horizontally on the center of gravity G of the load member;

FIG. 2(C) shows the amount of displacement of optical fiber rolls occurring in FIG. 2(B); and FIG. 2(D) shows the profile of the shear stress acting on the optical fiber rolls in FIG. 2(B).

FIGS. 4(A) and 4(B) are diagrams showing optical fiber rolls according to a second embodiment of the present invention, in which FIG. 4(A) is a plan view showing four split triangular optical fiber rolls disposed at the bottom of a quadrangular prism-shaped load member in such a manner as to face each other across diagonal lines, and FIG. 4(B) is a plan view showing four isosceles triangle-shaped split optical fiber rolls disposed at the bottom of a quadrangular prism-shaped load member in such a manner that the vertices of the optical fiber rolls correspond to the four sides of the bottom of the quadrangular prism-shaped load member.

FIGS. 5(A) and 5(B) are diagrams showing a third embodiment of the present invention in which accelerometer components are provided on the six surfaces of a quadrangular prism-shaped load member, in which FIG. 5(A) is a top plan view showing the accelerometer having pressure members and their associated members provided for four horizontal directions, with pressure members and their associated members for the vertically upward and downward directions removed, and FIG. 5(B) is an exploded perspective view showing the load member, together with an optical fiber roll and a pressure plate provided for one surface thereof, with the illustration of optical fiber rolls and pressure plates for the other surfaces omitted for the purpose of facilitating understanding.

FIGS. 8(A) to 8(D) are diagrams showing the structure of optical fiber rolls and the way in which the optical fiber rolls are disposed, in which:

FIG. 8(A) is a perspective view of an optical fiber roll (108A) shown in FIG. 6;

FIG. 8(B) is a side view of the optical fiber roll (108A) as seen through a molding from the direction of the arrow A' in FIG. 8(A);

FIG. 8(C) is a plan view of a force sensor (108) having a plurality of circular cylinder-shaped optical fiber rolls (108A) as shown in FIG. 8(A) which are disposed on a rigid plate (108B); and FIG. 8(D) is a plan view of another type of force sensor (108') provided with a meandrous optical fiber roll.

FIGS. 20(A) to 20(C) are diagrams showing a force sensor (108") having an optical fiber roll (191) disposed in a bag member (190) filled with a viscous liquid and the way in which an external pressure is applied to the force sensor (108"), in which:

FIG. 20(A) is a plan view of a force sensor having a meandrous optical fiber cable disposed in a bag member filled with a viscous liquid;

FIG. 20(B) is a perspective view of the force sensor shown in FIG. 20(A), in which the configuration of the meandrous optical fiber roll is shown in a simplified form; and FIG. 20(C) is a sectional view of the force sensor (108") taken along the line M—M in FIG. 20(A) and seen from the direction of the arrow P'.

DESCRIPTION OF PREFERRED EMBODIMENTS

First to third embodiments of the present invention will be described below with reference to the accompanying drawings.

Figure 1A:
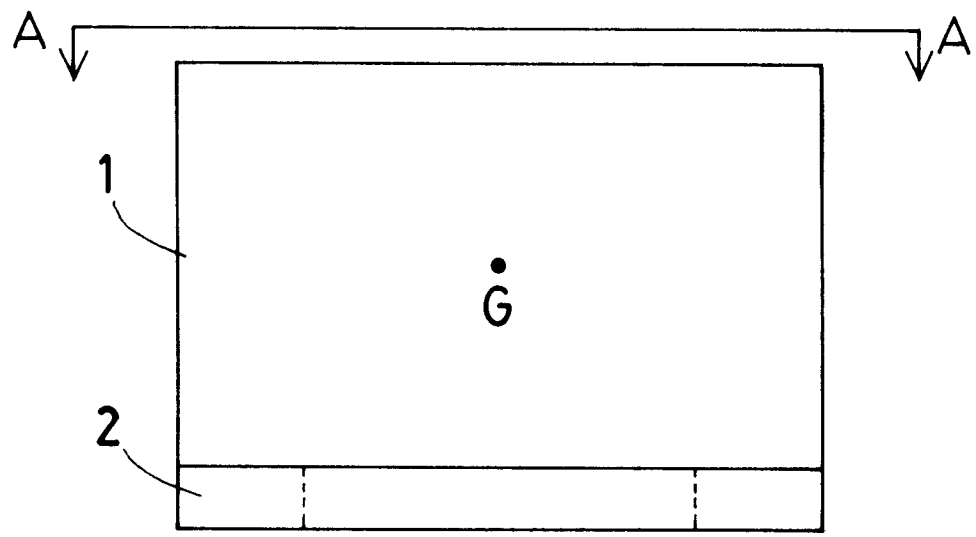
Figure 1B:
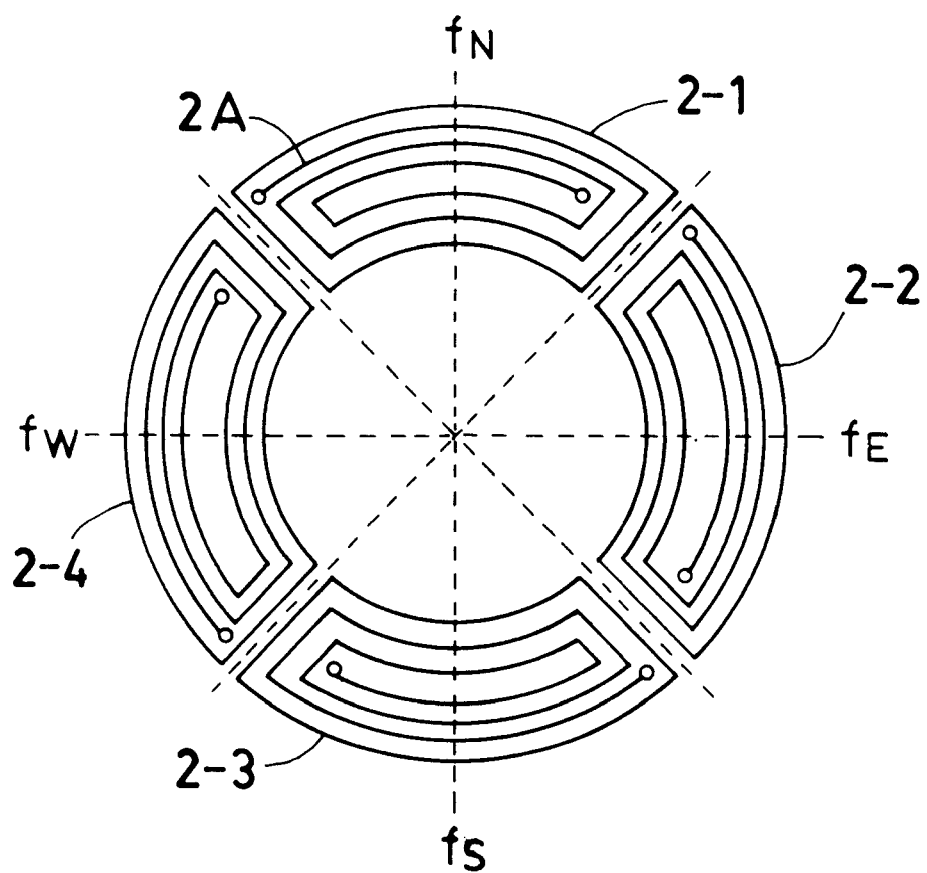
Figure 2A:
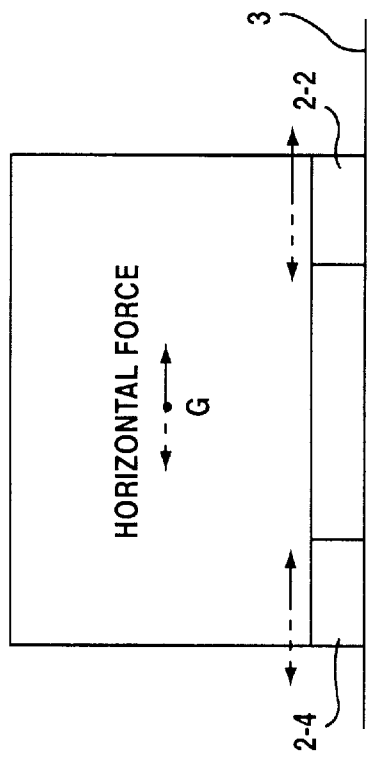
Figure 2B:
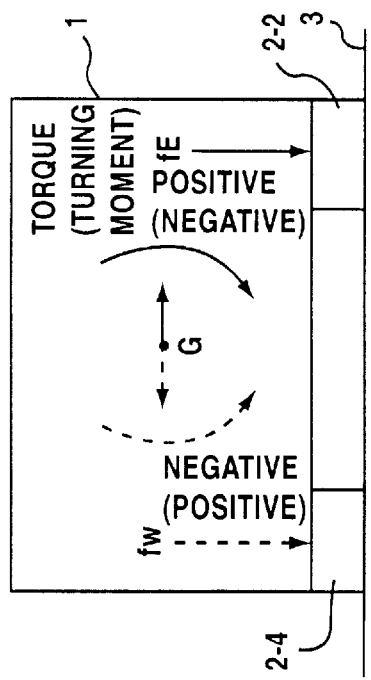
Figure 2C:
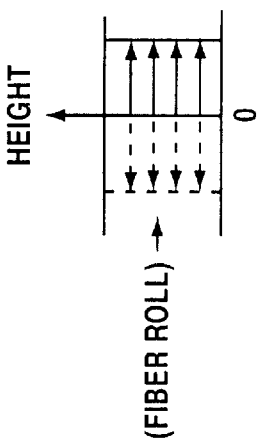
Figure 2D:

FIGS. 1(A) and 1(B) show a first embodiment of a three-component seismometer according to the present invention. FIG. 1(A) is a front view of an accelerometer comprising a columnar load member and optical fiber rolls provided at the bottom of the load member. FIG. 1(B) is a top plan view of optical fiber rolls which are split into four for the north, south, east and west directions and disposed in a ring shape. FIG. 2(A) is a sectional view of the accelerometer shown in FIG. 1(A), taken along the line A—A passing through the center of gravity G of the accelerometer. FIG. 2(A) shows the way in which a pressure component is produced by a change of torque (turning moment) acting clockwise or counterclockwise about the center of gravity G of the load member. FIG. 2(B) shows the way in which a shear stress of uniform magnitude is produced by force acting horizontally (in the direction shown by the solid line or the dotted line) on the center of gravity G of the load member constituting the accelerometer. FIG. 2(C) shows the amount of displacement occurring in the case of FIG. 2(B) by the solid lines or the dotted lines. The displacement increases gradually with distance from the bottom 0 of the split optical fiber rolls 2-1 and 2-4 to the top thereof. FIG. 2(D) shows the shear stress produced in the case of FIG. 2(B) by the solid lines or the dotted lines. The magnitude of the shear stress is uniform from the bottom 0 of the split optical fiber rolls 2-1 and 2-4 to the top thereof. It the figures: reference numeral 1 denotes a columnar load member; 2 denotes optical fiber rolls; 2A denotes an optical fiber winding; 2-1 to 2-4 denote split optical fiber rolls; and 3 denotes an installation surface.

The columnar load member 1 shown in FIG. 1(A) is made of a material, e.g. a metal, which has such a high rigidity that it is hard to deform by an impact. Optical fiber rolls 2 each having an optical fiber winding 2A are provided at the bottom of the columnar load member 1. The optical fiber rolls 2 have the properties that when the load (pressure) of the columnar load member 1 is applied thereto, the light propagation characteristics thereof (e.g. the phase of optical signal) change sensitively in response to changes in the pressure applied from the columnar load member 1. The optical fiber rolls 2 are, as shown in FIG. 1(B), split into four split optical fiber rolls 2-1 to 2-4 each having an optical fiber winding 2A arranged to form a loop (spiral shape). The split optical fiber rolls 2-1 to 2-4 are disposed in a ring shape to face north, east, south and west, respectively, with a gap provided between each pair of adjacent optical fiber rolls. The columnar load member 1 and the optical fiber rolls 2 are integrated into one unit and placed on an installation surface 3, as shown in FIG. 2(A).

Normally, the columnar load member 1 is applying a load (pressure) uniformly to the split optical fiber rolls 2-1 to 2-4. However, when the columnar load member 1 is caused to oscillate by an earthquake or other motion, the load applied to the split optical fiber rolls 2-1 to 2-4 changes. The light propagation characteristics of the split optical fiber rolls 2-1 to 2-4 change sensitively in response to changes in the applied load. Therefore, the changes in the light propagation characteristics are detected as phase shifts of optical signals from the split optical fiber rolls 2-1 to 24.

For example, when an oscillation is applied to the split optical fiber rolls 2-2 to 2-4, as shown in FIG. 2(A), in such a manner that a horizontal force acts on the center of gravity G of the load member 1 in the direction indicated by the solid line or the dotted line, that is, an acceleration change is brought about with respect to the center of gravity G of the columnar load member 1, a torque $\tau$ is produced to act in the direction indicated by the solid line or the dotted line by the turning moment on the columnar load member 1 produced around the center of gravity G of the load member 1. Consequently, the pressure components $f_E$ and $f_W$ exerted on the mutually opposing split optical fiber rolls 2-2 to 2-4 change in the opposite senses to each other. More specifically, when a torque is produced in the direction indicated by the solid line, a positive pressure component $f_E$ acts on the fiber roll 2-2, whereas a negative pressure component $f_W$ acts on the fiber roll 2-4. When a torque is produced in the direction indicated by the dotted line, a negative pressure component $f_E$ acts on the fiber roll 2-2, whereas a positive pressure component $f_W$ acts on the fiber roll 2-4. Similarly, when an oscillation that brings about an acceleration change is applied to the split optical fiber rolls 2-1 and 2-3, pressure components $f_N$ and $f_S$ exerted on the split optical fiber rolls 2-1 and 2-3 change in the opposite senses to each other as stated above. Accordingly, the accelerations of the two horizontal components can be detected accurately by detecting the difference between the pressure components $f_E$ and $f_W$ acting on the mutually opposing split optical fiber rolls 2-2 and 2-4 and further detecting the difference between the pressure components $f_N$ and $f_S$ acting on the mutually opposing split optical fiber rolls 2-1 and 2-3.

Incidentally, when a horizontal force acts on the center of gravity G in the direction indicated by the solid line or the dotted line as shown in FIG. 2(B), the split optical fiber rolls 2-2 to 2-4 undergo displacements, respectively, as shown in FIG. 2(C), which have the same magnitude and the same polarity and increase gradually with distance from the bottom 0 of the split optical fiber rolls 2-2 to 2-4 to the top thereof, as shown by the solid lines or the dotted lines in FIG. 2(C). Moreover, as shown in FIG. 2(D), shear stresses are produced in the split optical fiber rolls 2-2 to 2-4, which have the same polarity and a magnitude uniform from the bottom 0 of the split optical fiber rolls 2-2 to 2-4 to the top thereof as shown by the solid lines or the dotted lines. Therefore, phase shifts due to the shear stresses of uniform magnitude and the displacements can be canceled by subtracting the outputs from the mutually opposing split optical fiber rolls 2-1 and 2-3 from each other and also subtracting the outputs from the mutually opposing split optical fiber rolls 2-2 to 2-4 from each other.

Accordingly, in a case where the split optical fiber rolls 2-1 and 2-3 are disposed to face north (N) and south (S), respectively, as shown in FIG. 1(B), if the columnar load member 1 is accelerated in the north-south direction, the acceleration acting on the load member 1 can be obtained from the amount of change of the pressure component $f_N$ detected from the split optical fiber roll 2-1 and the amount of change of the pressure component $f_S$ detected from the split optical fiber roll 2-3. Similarly, if the columnar load member 1 is accelerated in the east-west direction, the acceleration acting on the load member 1 can be obtained from the amount of change of the pressure component $f_E$ detected from the fiber roll 2-2 and the amount of change of the pressure component $f_W$ detected from the fiber roll 2-4. Thus, the accelerations of the two horizontal components can be detected. When the columnar load member 1 is accelerated in the vertical direction, the acceleration of the vertical component can be obtained from the amounts of change of the pressure components $f_N$, $f_E$, $f_S$ and $f_W$ detected from the split optical fiber rolls 2-1 to 2-4, which are equal to each other. In this way, the accelerations of the three components can be detected.

Figure 3:
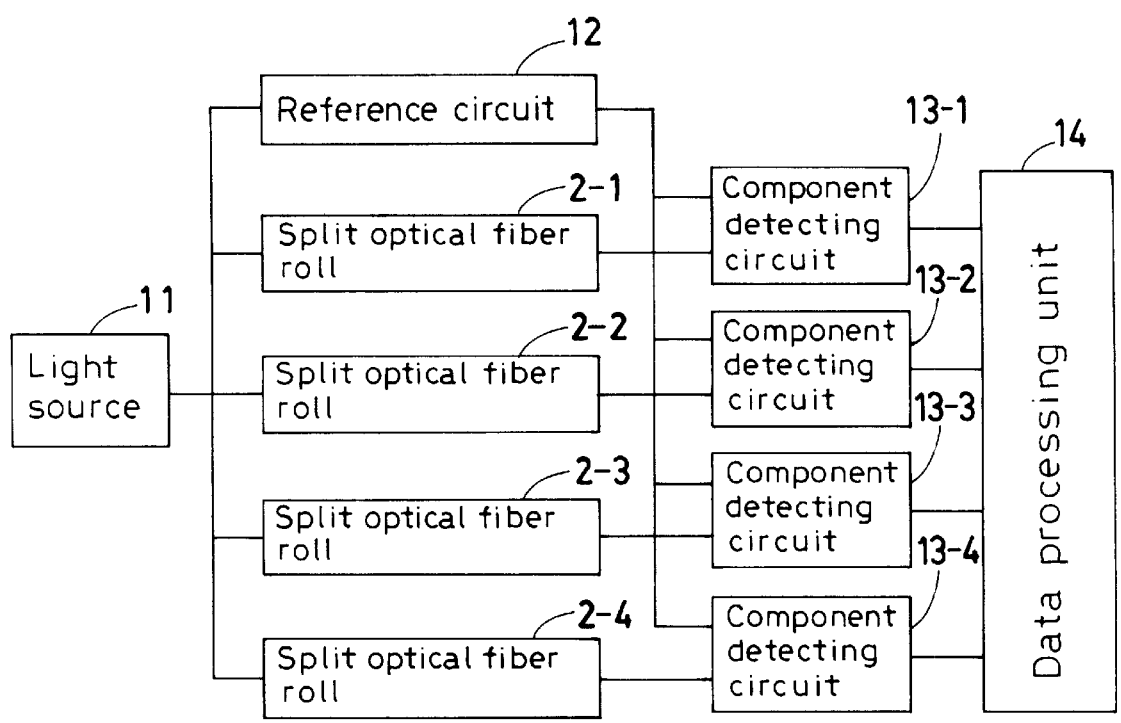
FIG. 3 is a block diagram showing an example of the arrangement of a data processing unit.

FIG. 3 is a block diagram showing an example of the arrangement of a data processing unit that forms a constituent part of the accelerometer. In the figure: reference numeral 11 denotes a light source; 12 denotes a reference circuit; 13-1 to 13-4 denote component detecting circuits; and 14 denotes a data processing unit.

In FIG. 3, the reference circuit 12 produces reference light to which output light from each of the split optical fiber rolls 2-1 to 2-4 is referred. The component detecting circuits 13-1 to 13-4 refer the output light from the split optical fiber rolls 2-1 to 2-4 to the reference light from the reference circuit 12 to obtain phase differences and to detect pressure components $f_N$, $f_E$, $f_S$ and $f_W$, respectively. The data processing unit 14 calculates the accelerations of the three components from the pressure components $f_N$, $f_E$, $f_S$ and $f_W$ detected by the component detecting circuits 13-1 to 13-4.

More specifically, in the calculation of acceleration, the acceleration in the north-south direction as one horizontal axis direction can be obtained by extracting the difference between the amounts of change of the pressure components $f_N$ and $f_S$, i.e. $\Delta f_N - \Delta f_S$, and the acceleration in the east-west direction as another horizontal axis direction can be obtained by extracting the difference between the amounts of change of the pressure components $f_E$ and $f_W$, i.e. $\Delta f_E - \Delta f_W$. The acceleration in the vertical direction can be obtained by extracting the sum of the amounts of change of the pressure components $f_N$, $f_E$, $f_S$ and $f_W$, which are the same, i.e. $\Delta f_N + \Delta f_E + \Delta f_S + \Delta f_W$. In other words, in a case where there is acceleration only in the vertical direction, the amount of change of each pressure component is the same positive value. In a case where there is no acceleration in the vertical direction but acceleration only in a horizontal axis direction, one of the amounts of change of the pressure components detected from each pair of mutually opposing split optical fiber rolls assumes a positive value, and the other a negative equivalent of the positive value.

In a case where the pressure components $f_N$, $f_E$, $f_S$ and $f_W$ assume unequal values at the time of installation of the accelerometer, a correction value is previously obtained from these values to make corrections, thereby enabling acceleration to be obtained accurately.

Figure 4A:
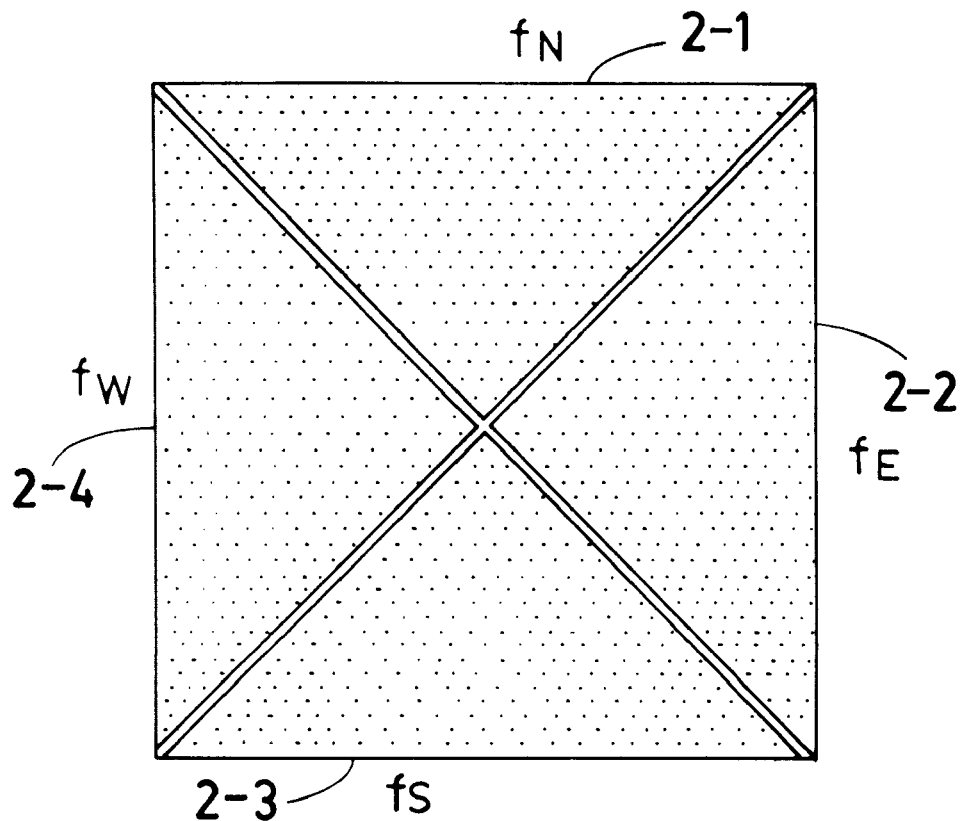
Figure 4B:
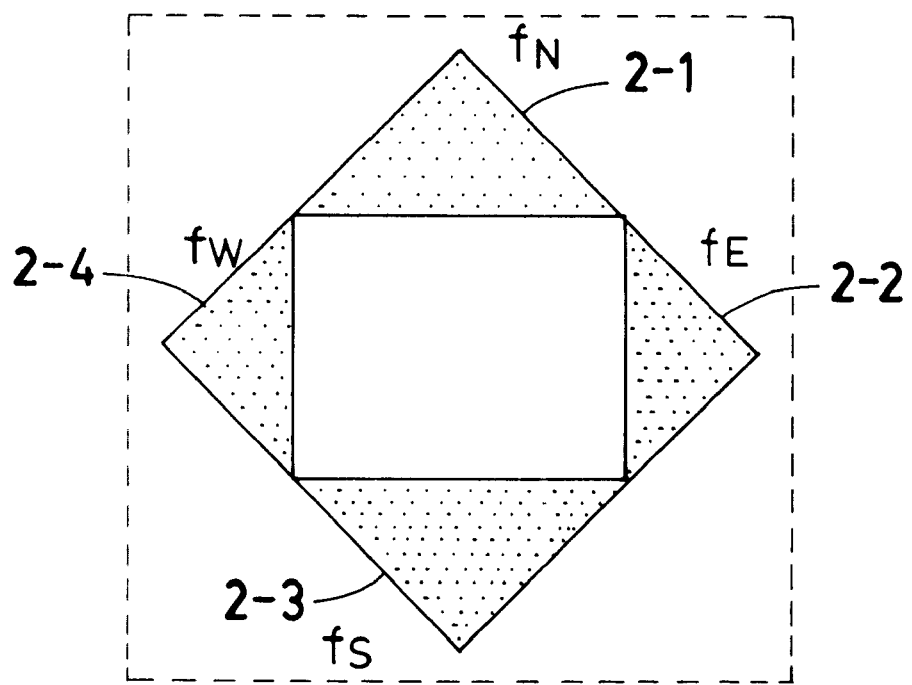

FIGS. 4(A) and 4(B) show optical fiber rolls according to a second embodiment of the present invention.

As a load member, a quadrangular prism-shaped load member can be used in place of the above-described columnar load member. In this case, as shown in FIG. 4(A), four split triangular optical fiber rolls 2-1 to 2-4 are disposed at the bottom of the quadrangular prism-shaped load member in such a manner as to face each other across diagonal lines, thereby making it possible to detect horizontal motion outputs efficiently. The arrangement may be such that, as shown in FIG. 4(B), isosceles triangle-shaped split optical fiber rolls 2-1 to 2-4 are disposed at the bottom of a load member shown by the dotted line such that the oblique side of each isosceles triangle-shaped split optical fiber roll lies on each side of a rectangular areal member depicted for the sake of convenience.

Figure 5B:
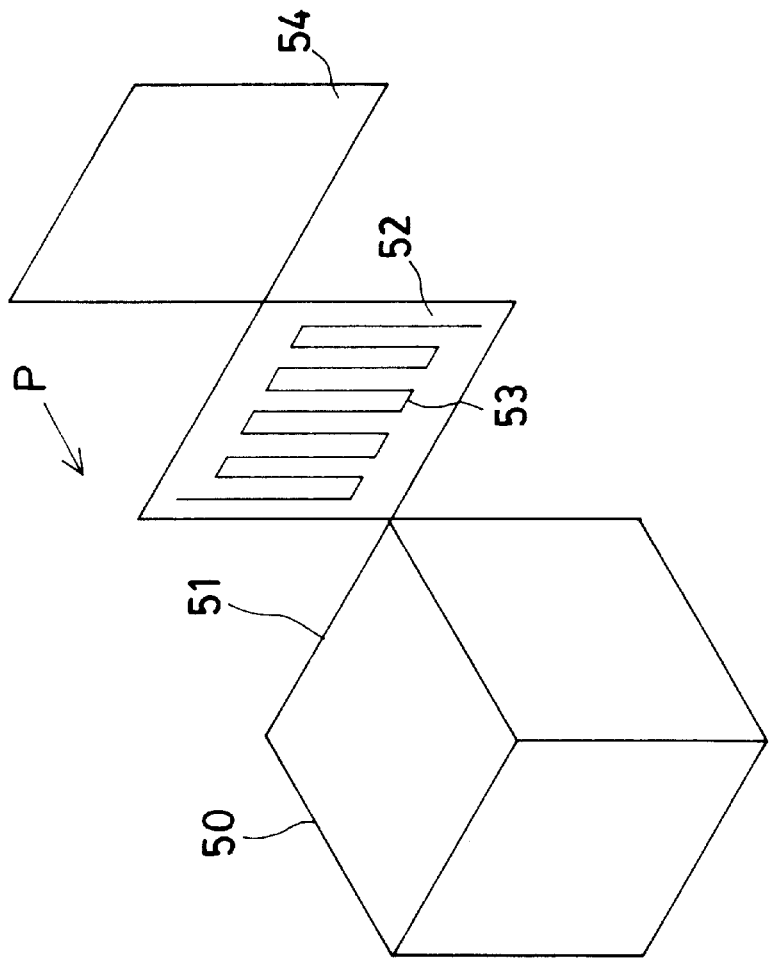
Figure 5A:
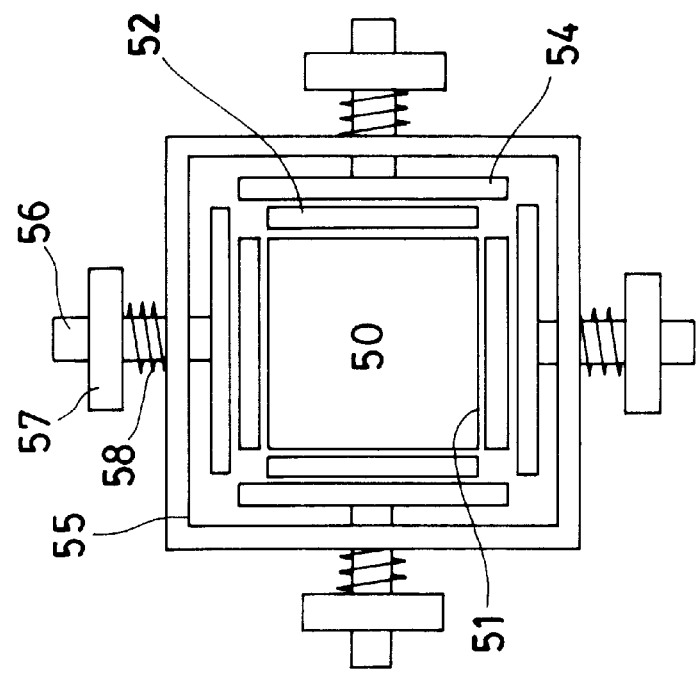

FIGS. 5(A) and 5(B) show a third embodiment of the present invention in which accelerometer components are provided on the six surfaces of a quadrangular prism-shaped load member. FIG. 5(A) is a top plan view showing the accelerometer having pressure members and their associated members provided for four horizontal directions, with pressure members and their associated members for the vertically upward and downward directions removed for the purpose of facilitating the understanding of the arrangement. FIG. 5(B) is an exploded perspective view showing the quadrangular prism-load member, together with an optical fiber roll and a pressure plate provided for one surface thereof, with the illustration of optical fiber rolls and pressure plates for the other surfaces omitted for the purpose of simplifying the drawing.

Referring to FIGS. 5(A) and 5(B), a quadrangular prism-shaped load member 50 is disposed in the center of a cubic frame 55. Optical fiber rolls 52 are disposed to face opposite to the six surfaces, respectively, of the load member 50. Each optical fiber roll 52 has an optical fiber winding 53 disposed in a meandrous (or loop) shape, for example. A pressure plate 54 is disposed at the back of each optical fiber roll 52. The pressure plate 54 has a bolt 56 projecting from the center of the back thereof. The bolt 56 extends through each surface of the frame 55. A nut 57 is screwed onto the bolt 56 with a helical spring 58 interposed between the nut 57 and the frame 55. By controlling the degree of engagement of the nut 57 with the bolt 56, a pressure P is produced to apply an appropriate bias pressure to the optical fiber roll 52. By virtue of this arrangement, the load member 50 per se is held by the six pressure plates 54 with the optical fiber rolls 52 interposed therebetween. Consequently, the load member 50 does not tilt forward nor backward as the load member shown in FIGS. 1(A) and 1(B) does, but is displaceable in the north, south, east and west directions and also in the vertically upward and downward directions.

With the above-described arrangement, when it is accelerated in the north-south, east-west, or vertical direction, the load member 50 is displaced in the north-south, east-west or vertical direction to apply a load to the relevant optical fiber roll 51 under the bias pressure, causing a variation in the light propagation characteristics of the optical fiber roll 51. Thus, the acceleration is detected from the variation in the light propagation characteristics.

It is well known that velocity data and displacement data can be obtained by integrating data obtained from the accelerometer. Therefore, by providing an integrating circuit, the output from the three-component accelerometer according to the present invention can be used to obtain an output of a three-component velocity seismometer or a three-component displacement seismometer, which is necessary for evaluation of earthquake. It is also possible to regard the accelerometer according to the present invention as a three-component velocity seismometer or a three-component displacement seismometer. Therefore, the accelerometer according to the present invention is suitable for use in a seismometer.

The present invention is not necessarily limited to the foregoing embodiments but can be modified in a variety of ways. Although in the foregoing embodiments a phase difference is obtained by referring to standard light, it is also possible to obtain a phase difference by referring to the immediately previous output light. Accordingly, it is also possible to estimate a phase difference relative to standard light or the immediately previous output light by using an interferometer. Regarding other optical signal processing methods, for example, the accelerations of the three components can be obtained by a treatment similar to the above using changes in the intensity of back scattering light or forward scattering light or changes in the intensity of transmitted light. It is also possible to use a polygonal prism-shaped load member or a circular cylinder-shaped load member in place of the columnar load member shown in FIGS. 1(A) and 1(B).

The optical fiber windings may be encased in a molded resin material or the like having an elastic constant approximately equal to that of the optical fibers to prevent unnecessary internal deformation caused by the input of an earthquake motion from the outside owing to the play among the turns of the optical fiber winding in each optical fiber roll.

Incidentally, in the accelerometer using optical fiber rolls as shown in FIGS. 5(A) and 5(B), an optical fiber roll is disposed for each of the north, south, east, west, vertically upward and downward directions, and the output signal from each optical fiber roll is detected and processed. Therefore, if the detection sensitivity of the optical fiber rolls is inferior, the output signal level is unfavorably low. In a case where the characteristics of the fiber rolls are not uniform on account of manufacturing errors, the outputs from the optical fiber rolls are not equal to each other, and this causes a detection error. Moreover, in this case, the accuracy of the data processing result is unfavorably low. In addition, it is necessary to provide pressure plates, helical springs and nuts as members needed to realize a servo function for applying an appropriate bias pressure to the optical fiber rolls 52. Embodiments of the present invention for resolving such problems will be described below with reference to FIGS. 6 to 21.

Figure 6:
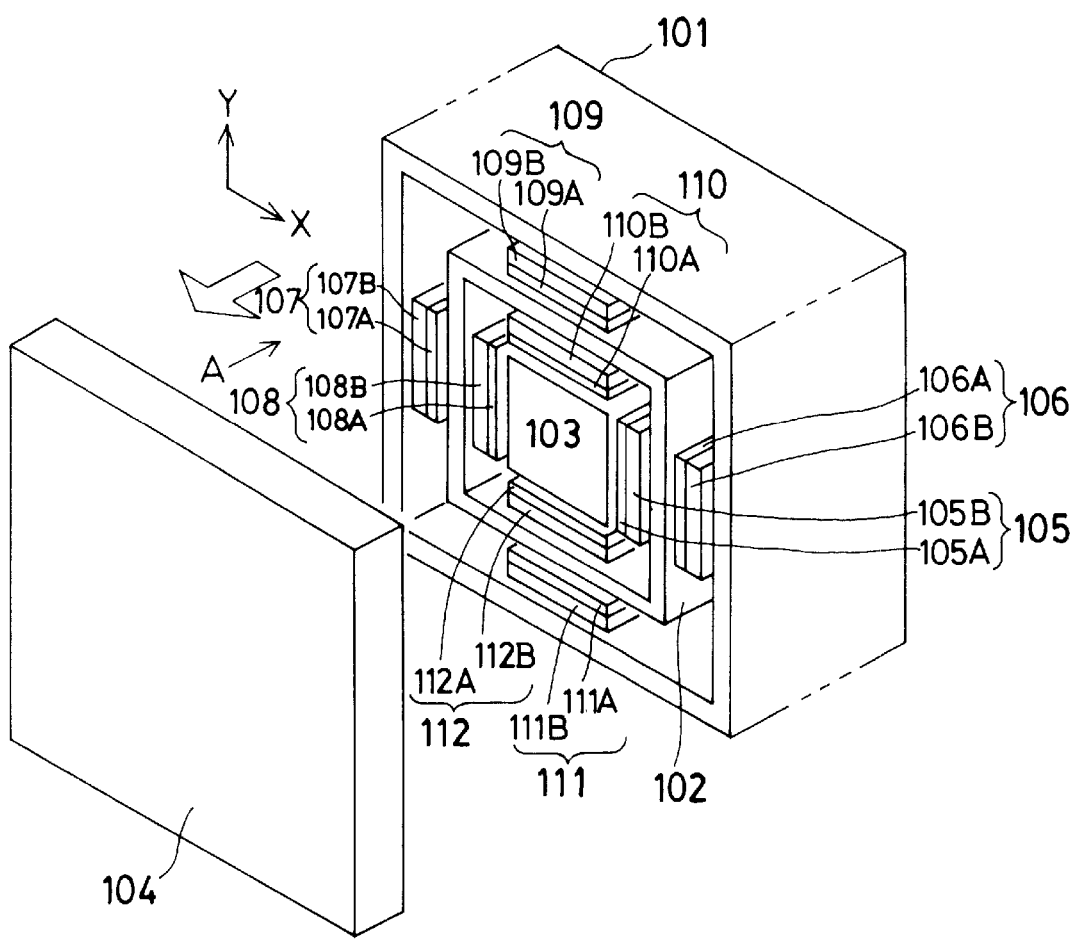
FIG. 6 is a perspective view of a fourth embodiment of a seismometer according to the present invention that measures accelerations in the directions of two horizontal axes, showing the interior structure of a hollow rectangular prism-shaped load member (101) with a part (104) thereof cut and separated in the direction of the arrow.
Figure 7:
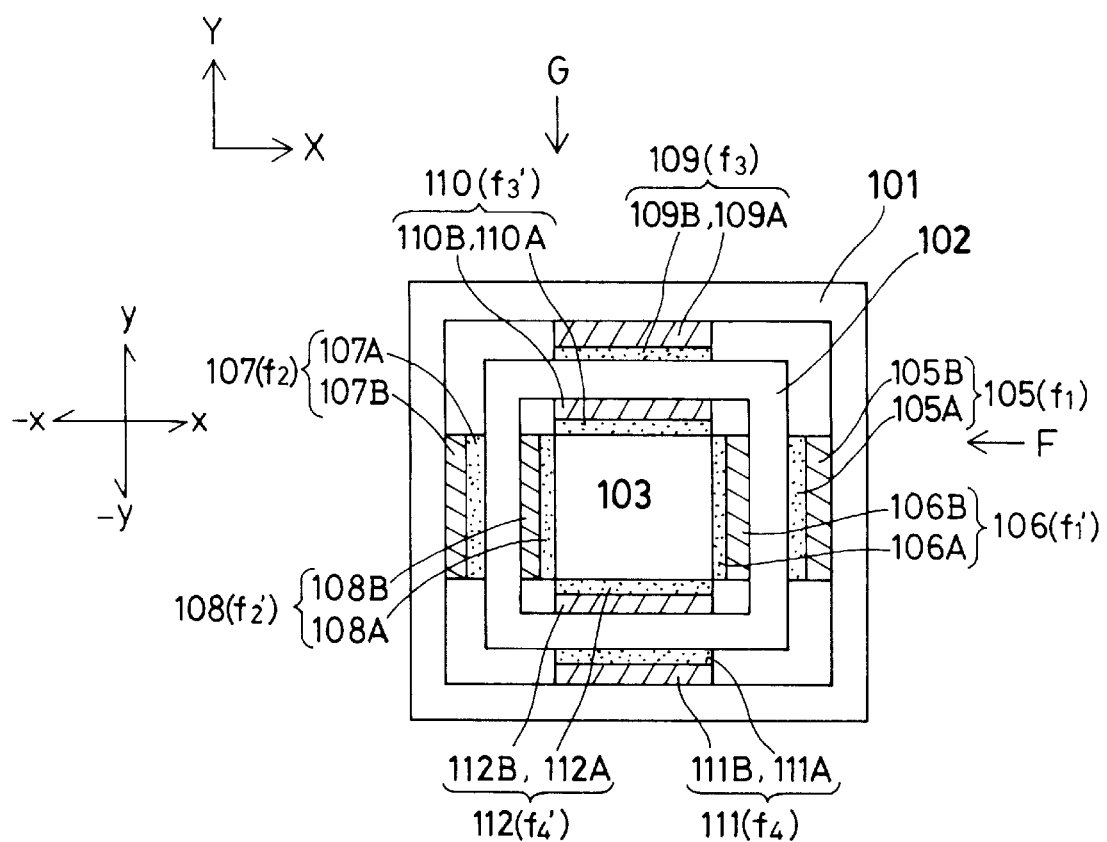
FIG. 7 is a diagram showing the load member (101) of the seismometer as seen from the direction of the arrow A in FIG. 6.
Figure 8A:
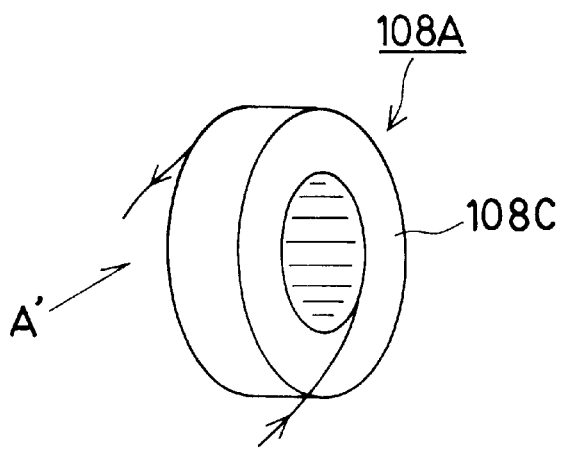
Figure 8B:
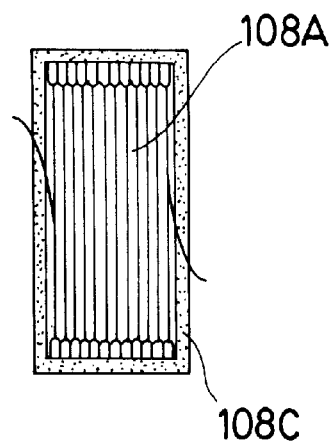
Figure 8C:
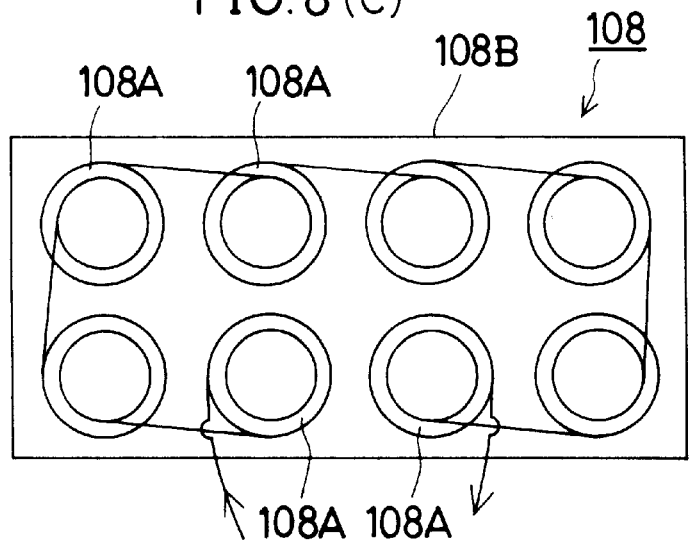
Figure 8D:
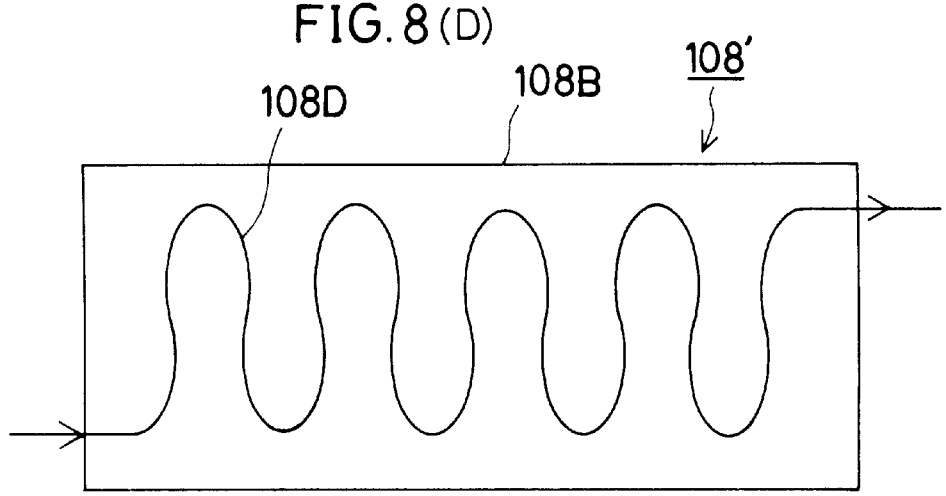

FIGS. 6 to 8(D) show a fourth embodiment of the seismometer according to the present invention. FIG. 6 is a perspective view of a hollow rectangular prism-shaped load member 101, showing the interior structure thereof with a part 104 of the load member 101 cut and separated in the direction of the arrow. FIG. 7 shows the load member 101 of the seismometer as seen from the direction of the arrow A in FIG. 6. FIG. 8(A) is a perspective view showing a molded optical fiber roll 108A of a force sensor 108. FIG. 8(B) is a side view of the optical fiber roll 108A as seen through a molding 108C from the direction of the arrow A' in FIG. 8(A). FIG. 8(C) is a plan view of the force sensor 108 having a plurality of optical fiber rolls 108A disposed on a rigid plate 108B. FIG. 8(D) is a plan view of another type of force sensor 108' provided with a meandrous optical fiber roll.

The hollow rectangular prism-shaped load member 101 is fixed to a support base (not shown). A rectangular cylinder-shaped load member 102 is disposed in the space in the load member 101 with gaps provided therebetween. The rectangular cylinder-shaped load member 102 surrounds a solid rectangular prism-shaped load member 103 with gaps provided therebetween. Force sensors 105, 106, 107 and 108 are disposed in the respective gaps in the load member 101 which are formed between the load members 101, 102 and 103 in two horizontal directions as viewed in the figure, i.e. ±X directions. More specifically, the force sensor 105 is disposed in the gap formed between the load members 102 and 103 on the +X side of the load member 103. The force sensor 106 is disposed in the gap formed between the load members 101 and 102 on the +X side of the load member 102. The force sensor 107 is disposed in the gap formed between the load members 101 and 102 on the −X side of the load member 102. The force sensor 108 is disposed in the gap formed between the load members 102 and 103 on the −X side of the load member 103. The force sensors 105, 106, 107 and 108 have optical fiber rolls 105A, 106A, 107A and 108A provided on rigid plates 105B, 106B, 107B and 108B, respectively. The optical fiber rolls 105A to 108A are formed from optical fibers constituting a part of an optical fiber cable, e.g. plastic fibers. The optical fiber rolls 105A to 108A have the function of shifting the phase of light transmitted therethrough by changing the light propagation characteristics upon receiving a pressure, and further have a smaller elastic constant than those of the load members 101, 102 and 103 and the rigid plates 105B to 108B, which are formed from a metallic material, e.g. iron. The optical fiber rolls 105A to 108A each function as a spring member by virtue of the elasticity of an optical fiber roll formed in a circular cylinder shape or a meandrous shape. Force sensors 109, 110, 111 and 112 are disposed in the respective gaps in the load member 101 which are formed between the load members 101, 102 and 103 in two vertical directions as viewed in the figure, i.e. ±Y directions. More specifically, the force sensor 109 is disposed in the gap formed between the load members 101 and 102 on the +Y side of the load member 102. The force sensor 110 is disposed in the gap formed between the load members 102 and 103 on the +Y side of the load member 103. The force sensor 111 is disposed in the gap formed between the load members 101 and 102 on the −Y side of the load member 102. The force sensor 112 is disposed in the gap formed between the load members 102 and 103 on the −Y side of the load member 103. The force sensors 109, 110, 111 and 112 have optical fiber rolls 109A, 110A, 111A and 112A provided on rigid plates 109B, 116B, 111B and 112B, respectively. The optical fiber rolls 109A to 112A have the same functions as those of the optical fiber rolls 105A to 108A. Incidentally, the elastic constant of iron is, for example, in the range of from 1 to $2 \times 10^{11}$ N/m$^2$, and optical fiber rolls having an elastic constant in the range of from $10^8$ to $10^{10}$ N/m$^2$ are used.

The above-described force sensors having circular cylinder-shaped optical fiber rolls are arranged as follows: A multiplicity of turns of an optical fiber cable are wound on the outer periphery of a circular cylinder-shaped mold frame (not shown). Thereafter, the mold frame is drawn out from the wound optical fiber cable. Then, the optical fiber cable winding is molded so as to be encased in a molding 108C as shown in FIG. 8(B), thereby forming a circular cylinder-shaped optical fiber roll 108A as shown in FIG. 8(A). Then, as shown for example in FIG. 8(C), the end surfaces of a plurality of circular cylinder-shaped optical fiber rolls 108A are fixed to the surface of a rigid plate 108B formed from a metallic material, e.g. iron, and the optical fiber rolls 108A are connected to each other to form a force sensor 108. Light entering one of the optical fiber rolls 108A from the direction of the arrow passes through each optical fiber roll 108A and emanates from the final optical fiber roll 108A in the direction of the arrow.

The above-described circular cylinder-shaped optical fiber rolls may be broken when the fiber cable constituting each optical fiber roll is bent at a radius of curvature smaller than a certain value. Therefore, the seismometer according to the present invention may use force sensors each provided with an optical fiber roll which is formed from a meandrous fiber cable with a large radius of curvature. In some cases, a cable routing method is adopted in which a fiber cable is routed in such a manner that no portions of the fiber cable overlap each other on the cable routing surface, for the purpose of preventing a stress from being applied to a specific region of the fiber cable, that is, for the purpose of allowing the fiber cable to be stressed uniformly. As shown for example in FIG. 8(D), a force sensor 108' employing such a cable routing method is formed by disposing an optical fiber cable in a meandrous form on the surface of a rigid plate 108B and securing the optical fiber cable to the rigid plate 108B by molding (not shown).

Figure 9:
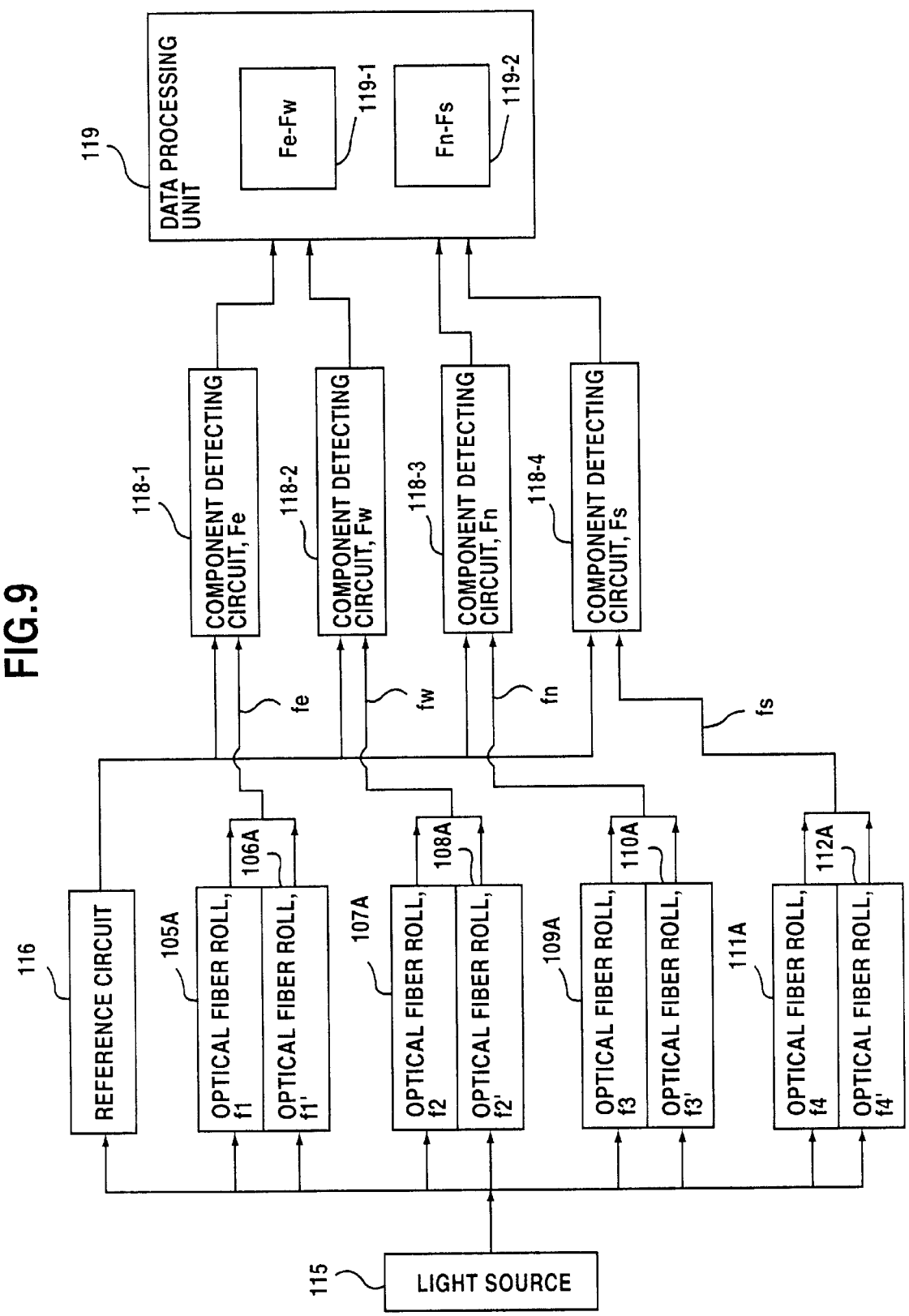
FIG. 9 is a diagram showing a data processing unit that calculates acceleration components in the directions of two horizontal axes.

As shown in FIG. 9, the optical fiber rolls 105A to 112A of the sensors 105 to 102 are arranged such that light from a light source 115 is split and sent individually to the optical fiber rolls 105A to 112A and also to a reference circuit 116. At the exit side, pressure components $f_1$ and $f_1'$ produced from the force sensors 105 and 106 are added together to obtain averaged composite phase-shifted light $f_e$, Similarly, pressure components $f_2$ and $f_2'$ from the force sensors 107 and 108, pressure components $f_3$ and $f_3'$ from the force sensors 109 and 110, and pressure components $f_4$ and $f_4'$ from the force sensors 111 and 112 are added to each other in parallel to obtain averaged composite phase-shifted light $f_w$, $f_n$ and $f_s$. Then, the composite phase-shifted light $f_e$, $f_w$, $f_n$ and $f_s$, together with reference light sent from the reference circuit 116, are inputted to component detecting circuits 118-1 to 118-4, respectively.

(1) Description of an example in which acceleration is applied in the X-axis direction:

Referring to FIG. 7, when a horizontal acceleration is applied to the load member 101 from the direction of the arrow F, the rectangular cylinder-shaped load member 102 and the solid load member 103 are displaced rapidly in the opposite direction to the direction of the arrow F in such a manner as to apply a pressure to the right-hand side portion of the load member 101 as viewed in the figure. The rigid plates 105B and 106B are also displaced rapidly by inertial force due to the mass thereof. Consequently, a large pressure is surely transmitted and applied to the optical fiber rolls 105A and 106A of the sensors 105 and 106 by the cylinder-shaped load member 102 and the solid load member 103, together with the rigid plates 105B and 106B of the sensors 105 and 106, and pressure components $f_1$ and $f_1'$ are produced. At this time, the elasticity of the optical fiber rolls 105A and 106A, i.e. spring function, makes it possible to exhibit a servo function, without adding a special component, by which the displacement of the cylinder-shaped load member 102 and the solid load member 103, together with the rigid plates 105B and 106B of the sensors 105 and 106, is stopped at a position where the spring force balances with the pressure applied from the load members 102 and 103 and the rigid plates 105B and 106B.

On the other hand, the left-hand side portions of the cylinder-shaped load member 102 and solid load member 103 are displaced away from the left-hand side of the load member 101, causing a reduction in the pressure applied previously to the sensor 107 provided between the load member 101 and the cylinder-shaped load member 102 and to the sensor 108 provided between the cylinder-shaped load member 102 and the solid load member 103. Consequently, the pressure components $f_2$ and $f_2'$ produced in the sensors 107 and 108 change in the opposite sense (direction).

Accordingly, the acceleration applied from the direction of the arrow F is detected, as shown in FIG. 9, by obtaining a difference $(F_e-F_w)$ between a pressure component $F_e$ representing a phase difference between the reference light and composite phase-shifted light $f_e$ obtained by averaging the pressure components $f_1$ and $f_1'$ and a pressure component $F_w$ representing a phase difference between the reference light and composite phase-shifted light $f_w$ obtained by averaging the pressure components $f_2$ and $f_2'$. Because the seismometer is arranged to obtain an averaged output by combining the outputs from each sensor, even if the sensitivity of one sensor is no good, the output from the relevant sensor is corrected by averaging of the outputs from the other sensors. Therefore, the acceleration can be detected with high sensitivity.

Incidentally, the sensors 109, 110, 111 and 112, which lie in the Y-axis direction, are subjected to pressure changes $f_3$, $f_3'$, $f_4$ and $f_4'$, respectively, which are equal to each other because the solid load member 103 and the Y-direction rigid plates 109B, 110B, 111B and 112B are displaced sidewardly without exerting a pressure on these sensors. Accordingly, a pressure component $F_n$ representing a phase difference between the reference light and composite phase-shifted light $f_n$ obtained by averaging the pressure components $f_3$ and $f_3'$ and a pressure component $F_s$ representing a phase difference between the reference light and composite phase-shifted light $f_s$ obtained by averaging the pressure components $f_4$ and $f_4'$ are canceled by obtaining a difference $(F_n-F_s)$ between the pressure components $F_n$ and $F_s$.

(2) Description of an example in which acceleration is applied in the Y-axis direction:

Referring to FIG. 7, when acceleration in the Y-axis direction in the horizontal plane is applied to the load member 101 from the direction of the arrow G, the cylinder-shaped load member 102 and the solid load member 103 are displaced rapidly in the opposite direction to the direction of the arrow G. The rigid plates 109B and 110B are also displaced rapidly by inertial force due to the mass thereof. Consequently, a large pressure is surely transmitted and applied to the optical fiber rolls 109A and 110A of the sensors 109 and 110, which lie above the solid load member 103 as viewed in the figure, by the cylinder-shaped load member 102 and the solid load member 103, together with the rigid plates 109B and 110B of the sensors 109 and 110, and pressure components $f_3$ and $f_3'$ are produced. At this time, the elasticity of the optical fiber rolls 109A and 110A, which enable them to function as spring members, makes it possible to exhibit a servo function, without adding a special component, by which the displacement of the cylinder-shaped load member 102 and the solid load member 103, together with the rigid plates 109B and 110B of the sensors 109 and 110, is stopped at a position where the spring force balances with the pressure applied from the cylinder-shaped load member 102, the solid load member 103 and the rigid plates 109B and 110B.

The pressure components $f_4$ and $f_4'$ applied to the sensors 111 and 112, which lie below the solid load member 103, change in the opposite sense (direction).

Accordingly, the acceleration component applied from the direction of the arrow G can be detected with high sensitivity by obtaining a difference $(F_n-F_s)$ between a pressure component $F_n$ representing a phase difference between the reference light and composite phase-shifted light $f_n$ obtained by averaging the pressure components $f_3$ and $f_3'$ detected by the sensors 109 and 110 and a pressure component $F_s$ representing a phase difference between the reference light and composite phase-shifted light $f_s$ obtained by averaging the pressure components $f_4$ and $f_4'$ detected by the sensors 111 and 112.

The sensors 105 to 108, which lie in the X-axis direction, are subjected to pressure components $f_1$, $f_1'$, $f_2$ and $f_2'$, respectively, which are equal to each other because the solid load member 103 and the X-direction rigid plates 105B, 106B, 107B and 108B are displaced sidewardly without exerting a pressure on these sensors. Accordingly, a pressure component $F_e$ which represents a phase difference between the reference light and composite phase-shifted light $f_e$ obtained by averaging the pressure components $f_1$ and $f_1'$ and a pressure component $F_w$ which represents a phase difference between the reference light and composite phase-shifted light $f_w$ obtained by averaging the pressure components $f_2$ and $f_2'$ are canceled by obtaining a difference $(F_e-F_w)$ between the pressure components $F_e$ and $F_w'$ (3) General description of the measurement of accelerations applied in the X- and Y-axis directions:

In a case where the sensors 105 and 106 are disposed to face toward the direction X, and the sensors 107 and 108 toward the direction –X, acceleration applied in the X-axis direction can be obtained by determining a difference $(F_e-F_w)$ between an output $F_e$ representing a phase difference between the reference light and composite phase-shifted light $f_e$ obtained by averaging pressure components $f_1$ and $f_1'$ detected by the sensors 105 and 106 and an output $F_w$ representing a phase difference between the reference light and composite phase-shifted light $f_w$ obtained by averaging pressure components $f_2$ and $f_2'$ detected by the sensors 107 and 108.

Because the sensors 109 and 110 are disposed to face toward the direction Y, and the sensors 111 and 112 toward the direction –Y. acceleration applied in the Y-axis direction can similarly be obtained by determining a difference $(F_n-F_s)$ between an output $F_n$ representing a phase difference between the reference light and composite phase-shifted light $f_n$ obtained by averaging pressure components $f_3$ and $f_3'$ detected by the sensors 109 and 110 and an output $F_s$ representing a phase difference between the reference light and composite phase-shifted light $f_s$ obtained by averaging pressure components $f_4$ and $f_4'$ detected by the sensors 111 and 112.

Next, the operation of the fourth embodiment will be described with reference to the measuring circuit for measuring each pressure component, which is shown in FIG. 9. First, in order that the output characteristics of the sensors 105 and 106, which lie in the direction X, and those of the sensors 107 and 108, which lie in the direction –X, may be accurately matched with each other, the system is preset in a state where no acceleration is applied before the commencement of measurement as follows: In the component detecting circuits 118-1 to 118-4, composite phase-shifted light from the optical fiber rolls 105A to 112A and the reference light are converted into electric signals, and the signals are made to be in phase with each other so that an output based on an undesirable phase difference will not be generated.

The reference circuit 116, on which light from the light source 115 is incident, produces reference light set to a reference phase to make a phase comparison with output light from each of the optical fiber rolls 105A to 112A. Light sent from the light source 115 is split and incident on the optical fiber rolls 105A to 112A. The component detecting circuits 118-1 to 118-4 respectively refer composite phase-shifted light $f_e$, $f_w$, $f_n$ and $f_s$ obtained by averaging phase-shifted light from the optical fiber rolls 105A to 112A to the reference light from the reference circuit 116 to obtain phase differences $F_e$, $F_w$, $F_n$ and $F_s$, thereby detecting pressure change components $F_e$, $F_w$, $F_n$ and $F_s$. When acceleration is applied in the X-axis direction, an X-direction acceleration calculating section 119-1 in a data processing unit 119 extracts a difference ($F_e$–$F_w$) between the pressure components $F_e$ and $F_w$ to thereby obtain the acceleration applied in the X-axis direction. When acceleration is applied in the Y-axis direction, a Y-direction acceleration calculating section 119-2 in the data processing unit 119 extracts a difference ($F_n$–$F_s$) between the pressure components $F_n$ and $F_s$, thereby obtaining the acceleration applied in the Y-axis direction. As stated above, in the detection of acceleration applied in the X-axis direction, the outputs for the Y-axis direction are canceled; in the detection of acceleration applied in the Y-axis direction, the outputs for the X-axis direction are canceled.

Although in this embodiment a single force sensor is provided in each of the gaps between the hollow load member 101 and the cylinder-shaped load member 102 and between the cylinder-shaped load member 102 and the solid load member 103, it should be noted that a stack of a plurality of force sensors may be provided in each of the gaps.

In view of the temperature dependence of the light propagation characteristics of optical fiber rolls, it is necessary to make the heat capacity of the container, that is, the load member 101, as large as possible or to form the container from a material having a small thermal conductivity by, for example, burying a heat insulator or vacuum glass spheres in the constituent material, thereby making the load member 101 independent of the ambient temperature change and thus preventing the light propagation characteristics of the optical fiber rolls from varying with the change of ambient temperature.

Further, it is necessary to eliminate the influence of temperature as much as possible in order to measure optical signal changes precisely by using the above-described seismometer. Accordingly, the optical fiber cables through which the reference light and the measurement light pass, respectively, are disposed in atmospheric environments as similar as possible so as to be placed under the same temperature and pressure conditions. By doing so, accelerations can be obtained accurately. In this case, it is necessary to insert the reference light optical fiber cable in a rigid tube in order to prevent the pressure to be measured from being applied to the reference light optical fiber cable which would otherwise cause an undesirable phase shift.

Figure 10:
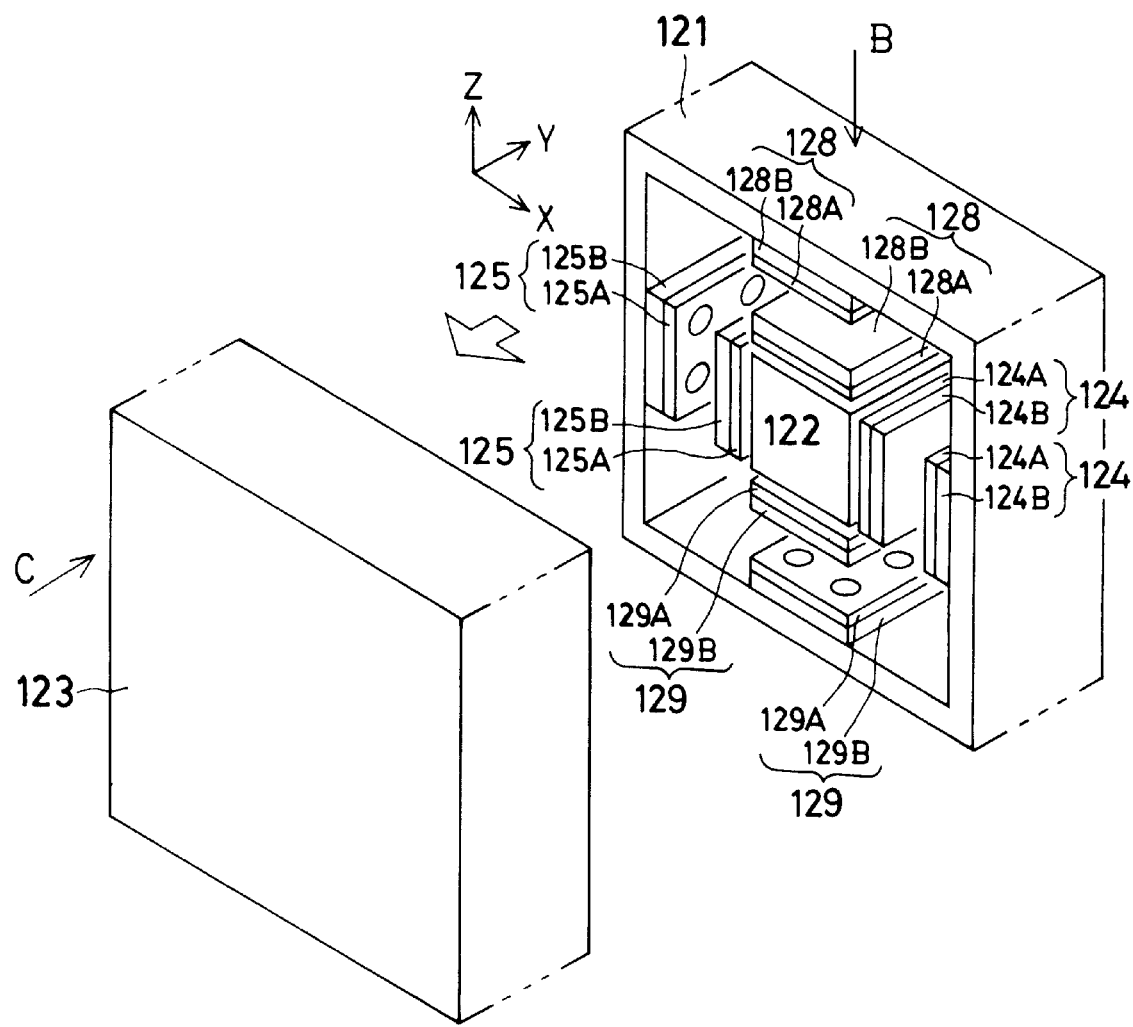
FIG. 10 is a perspective view of a fifth embodiment of a seismometer according to the present invention that measures accelerations in the directions of three axes X, Y and Z, showing the interior of a hollow rectangular prism-shaped load member (121) with a part (123) thereof cut and separated in the direction of the arrow and a sensor for the Y-axis direction removed.
Figure 11:
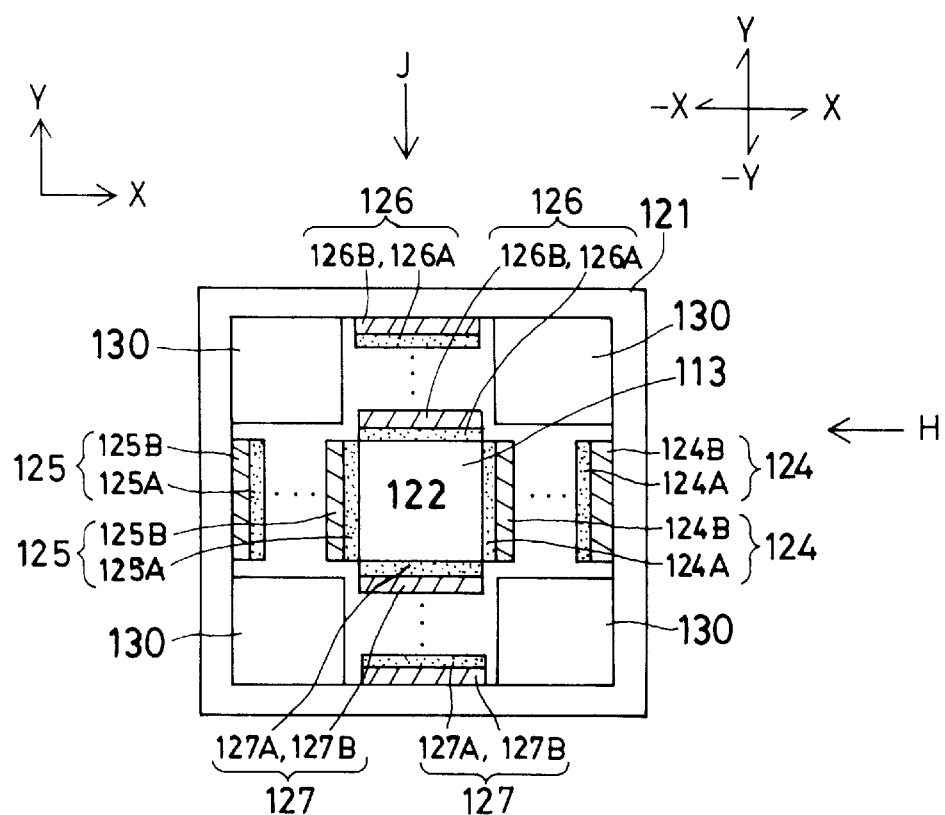
FIG. 11 is a diagram showing the seismometer as seen from the direction of the arrow B in FIG. 10, illustrating an arrangement for measuring accelerations in the directions of the X- and Y-axes with a sensor for the Z-axis direction removed.
Figure 12:
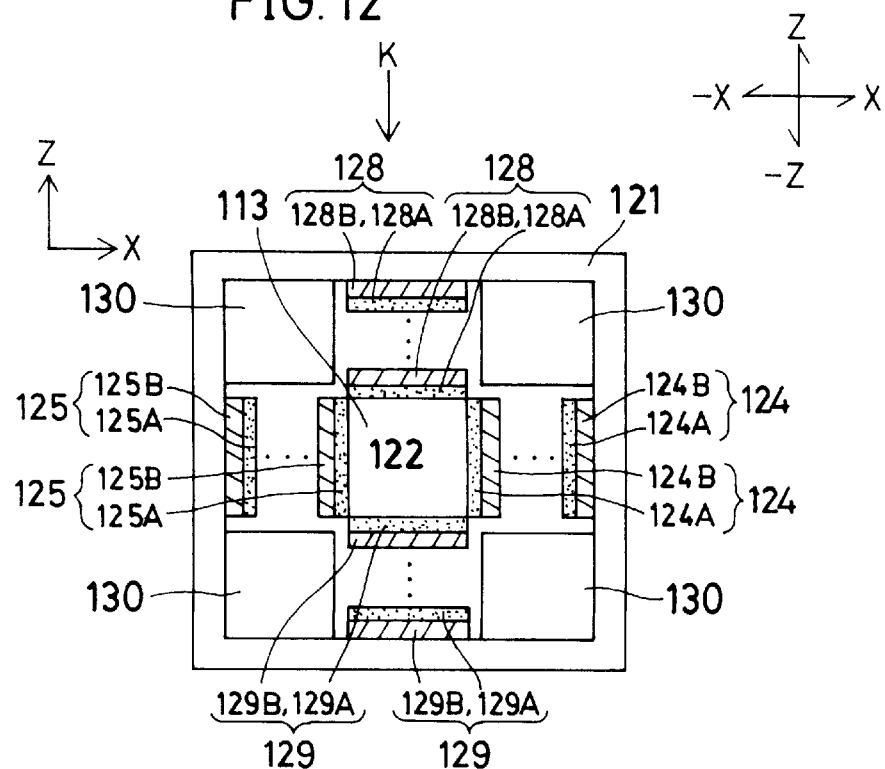
FIG. 12 is a diagram showing the seismometer as seen from the direction of the arrow C in FIG. 10, illustrating an arrangement for detecting accelerations in the two directions of the Z-axis.

The following is a description of a fifth embodiment of the seismometer according to the present invention that measures accelerations in four directions along two horizontal axes and two directions along a vertical axis. FIG. 10 is a perspective view of a seismometer, showing the interior of a hollow rectangular prism-shaped load member 121 with a part 123 thereof cut and separated in the direction of the arrow and a sensor for the Y-axis direction removed. FIG. 11 shows the seismometer as seen from the direction of the arrow B in FIG. 10, illustrating an arrangement for measuring accelerations in four directions along X- and Y-axes. FIG. 12 shows the seismometer as seen from the direction of the arrow C in FIG. 10, illustrating an arrangement for detecting accelerations in two directions along a Z-axis.

The hollow rectangular prism-shaped load member 121 is fixed to a support base (not shown). A rectangular prism-shaped solid load member 122 is disposed in the load member 121 with gaps provided therebetween. The surfaces of the solid load member 122 face toward the directions of orthogonal coordinate axes X, Y and Z, respectively. As shown in FIG. 11, a stack of force sensors 124 is disposed in the gap between the load members 121 and 122 on the +X side of the load member 122, and a stack of force sensors 125 is disposed in the gap between the load members 121 and 122 on the –X side of the load member 122. The force sensors 124 have optical fiber rolls 124A provided on the surfaces of rigid plates 124B, respectively. Similarly, the force sensors 125 have optical fiber rolls 125A provided on the surfaces of rigid plates 125B, respectively. As has been stated above, the optical fiber rolls 124A and 125A are each formed in a circular cylinder shape or a meandrous shape and have the function of shifting the phase of light transmitted therethrough according to the pressure applied thereto. The optical fiber rolls 124A and 125A further have elasticity with which they function as spring members. In his case, equal numbers of sensors 124 and sensors 125 are stacked so that there is no play among the sensors by virtue of the elasticity of the optical fiber cables forming the optical fiber rolls 124A and 125A. Further, as shown in FIG. 11, a stack of force sensors 126 is disposed in the gap between the load members 121 and 122 on the +Y side of the load member 122, and a stack of force sensors 127 is disposed in the gap between the load members 121 and 122 on the –Y side of the load member 122. The force sensors 126 have optical fiber rolls 126A provided on the surfaces of rigid plates 126B, respectively. The force sensors 127 have optical fiber rolls 127A provided on the surfaces of rigid plates 127B, respectively. The optical fiber rolls 126A and 127A have the same functions as those of the optical fiber rolls 124A and 125A. In this case also, equal numbers of sensors 126 and 127 are stacked so that there is no play among the sensors by virtue of the elasticity of the optical fiber rolls 126A and 127A.

Next, force sensors stacked in the gaps lying in the Z-axis (vertical) direction will be described with reference to FIG. 12. A stack of force sensors 128 is disposed in the upper gap between the solid load member 122 and the hollow load member 121, and a stack of force sensors 129 is disposed in the lower gap between the load members 121 and 122. The force sensors 128 have optical fiber rolls 128A provided on the surfaces of rigid plates 128B, respectively. The force sensors 129 have optical fiber rolls 129A provided on the surfaces of rigid plates 129B, respectively. The optical fiber rolls 128A and 129A have the same functions as those of the above-described optical fiber rolls 124A to 127A. In this case also, equal numbers of sensors 128 and 129 are stacked so that there is no play among the sensors by virtue of the elasticity of the optical fiber rolls 128A and 129A. The optical fiber rolls 124A, 125A, 126A, 127A, 128A and 129A have a servo function based on the elasticity thereof as in the case of the optical fiber rolls of the foregoing sensors 105 to 112.

Figure 13:
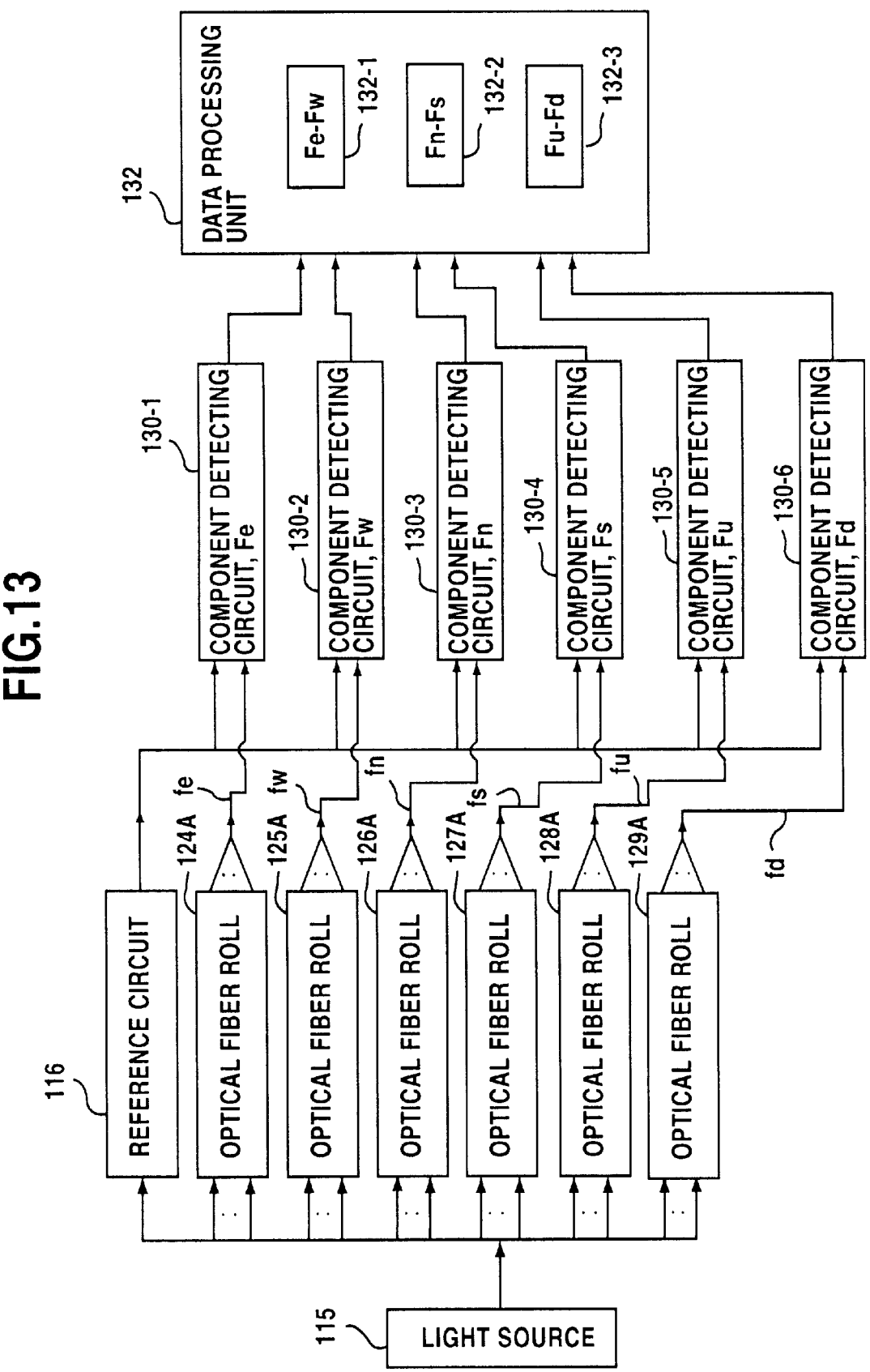
FIG. 13 is a diagram showing a data processing unit used in the fifth embodiment of the seismometer according to the present invention shown in FIG. 10.

It should be noted that reference numeral 113 in FIGS. 11 and 12 denotes one of the six end surfaces of the solid load member 103. Reference numeral 130 denotes four corners in the hollow load member 121 and also represents spacers which are disposed in respective spaces defined between the side surfaces of the force sensors 124, 125, 126, 127, 128 and 129 and the inner sides of the hollow load member 21 to set these sensors in position on the solid load member 22. In this embodiment also, as shown in FIG. 13, split light from a light source 115 is sent to each of the optical fiber rolls 124A to 129A of the sensors 124 to 129, and at the exit side of each sensor, the output light from the optical fiber rolls are added together to obtain averaged composite phase-shifted light.

Next, the operation of this embodiment will be described with reference to a measuring circuit shown in FIG. 13 in the order in which accelerations in the X-, Y- and Z-axis directions are measured. In this case also, component detecting circuits 130-1 to 130-6 are adjusted in advance such that composite output light obtained from each fiber roll under no-load conditions and the reference light are made to be in phase with each other, thereby preventing an undesirable phase difference from being outputted.

(4) Description of the measurement of acceleration in the X-axis direction:

Referring to FIG. 11, the seismometer is disposed such that the sensors 124 face toward the direction X, the sensors 125 toward the direction −X, the sensors 126 toward the direction Y, the sensors 127 toward the direction −Y, the sensors 128 toward the vertical direction Z, and the sensors 129 toward the vertical direction −Z. When acceleration is applied in the X-axis direction, that is, from the direction of the arrow H, the solid load member 122 is displaced rapidly in the opposite direction to the direction of the arrow H, and the sensors 124 are also displaced rapidly together with the rigid plates 124B. Consequently, the resultant of a pressure from the solid load member 122 and a pressure from each rigid plate 124B is surely transmitted and applied to the optical fiber rolls 124A of the sensors 124. At this time, the spring function of the circular cylinder-shaped optical fiber rolls 124A exhibits a servo function by which the displacement of the solid load member 122 and the rigid plates 124B is stopped at a position where the spring force balances with the pressure applied from the load member 122 and the rigid plates 124B. Because the solid load member 122 is displaced in the opposite direction to the direction of the arrow H, the pressure applied previously to the optical fiber rolls 125A of the sensors 125 reduces.

Incidentally, the solid load member 122 and the rigid plates 126B, 127B, 128B and 129B for the Y- and Z-axis directions are not displaced in the Y- and Z-axis directions in which they press the sensors 126 and 127 for the Y-axis direction and the sensors 128 and 129 for the Z-axis direction, but are displaced sidewardly with respect to the sensors 126, 127, 128 and 129 for the Y- and Z-axis directions. Consequently, the same pressure is exerted on the sensors 126 and 127. Similarly, the same pressure is exerted on the sensors 128 and 129. Therefore, the outputs for the Y-axis direction can be canceled by obtaining a difference between the output from the optical fiber rolls 126A of the sensors 126 for the Y-axis direction and the output from the optical fiber rolls 127A of the sensors 127 for the Y-axis direction. Similarly, the outputs for the Z-axis direction can be canceled by obtaining a difference between the output from the optical fiber rolls 128A of the sensors 128 for the Z-axis direction and the output from the optical fiber rolls 129A of the sensors 129 for the Z-axis direction.

Accordingly, as shown in FIG. 13, output light from the optical fiber rolls 124A of the sensors 124 for the direction X are averaged at the exit side to obtain composite phase-shifted light $f_e$, and a phase comparison between the composite phase-shifted light $f_e$ and the reference light is made in a component detecting circuit 130-1 to obtain a phase difference output $F_e$ (in the direction X). Similarly, composite phase-shifted light $f_w$ obtained by averaging output light from the optical fiber rolls 125A of the sensors 125 for the direction −X is inputted, together with the reference light, to a component detecting circuit 130-2 to obtain a phase difference output $F_w$ (in the direction −X). The phase difference outputs $F_e$ and $F_w$ are inputted to a data processing unit 132, and a difference ($F_e$−$F_w$) between the phase difference outputs $F_e$ and $F_w$ is obtained in a calculating section 132-1 to measure the acceleration applied in the X-axis direction.

As has been stated above, the same pressure is exerted on the optical fiber rolls of the sensors for the Y-axis direction. Therefore, composite phase-shifted light $f_n$, $f_s$, $f_u$ and $f_d$ obtained by averaging at the exit side of the optical fiber rolls 126A to 129A are inputted, together with the reference light, to the component detecting circuits 130-3 to 130-6, respectively. The component detecting circuit 130-3 obtains a phase difference output $F_n$ between the reference light and the composite phase-shifted light $f_n$ obtained by averaging the outputs from the optical fiber rolls 126A of the sensors 126 for the direction Y. The component detecting circuit 130-4 obtains a phase difference output $F_s$ between the reference light and the composite phase-shifted light $f_s$ obtained by averaging the outputs from the optical fiber rolls 127A of the sensors 127 for the direction −Y. The phase difference outputs $F_n$ and $F_s$ are inputted to a calculating section 132-2 in the data processing unit 132 to obtain a difference ($F_n$−$F_s$) therebetween, thereby canceling the outputs for the Y-axis direction.

Similarly, the same pressure is exerted on the optical fiber rolls of the sensors for the Z-axis direction. Therefore, composite phase-shifted light $f_u$ obtained by averaging the outputs from the optical fiber rolls 128A of the sensors 128 for the direction Z is inputted, together with the reference light, to the component detecting circuit 130-5, and composite phase-shifted light $f_d$ obtained by averaging the outputs from the optical fiber rolls 129A of the sensors 129 for the direction −Z is inputted, together with the reference light, to the component detecting circuit 130-6. The component detecting circuit 130-5 obtains a phase difference $F_u$ between the composite phase-shifted light $f_u$ and the reference light. The component detecting circuit 130-6 obtains a phase difference $F_d$ between the composite phase-shifted light $f_d$ and the reference light. The phase difference outputs $F_u$ and $F_d$ are inputted to a calculating section 132-3 in the data processing unit 132 to obtain a difference ($F_u$−$F_d$) therebetween, thereby canceling the outputs for the Z-axis direction.

(5) Description of the measurement of acceleration in the Y-axis direction:

Referring to FIG. 11, when acceleration is applied in the Y-axis direction, that is, from the direction of the arrow J, the solid load member 122 is displaced rapidly in the opposite direction to the direction of the arrow J, that is, upward as viewed in the figure, and the sensors 126 are also displaced rapidly together with the rigid plates 126B. Consequently, the resultant of a large pressure from the solid load member 122 and a pressure from each rigid plate 126B is surely transmitted and applied to the optical fiber rolls 126A of the sensors 126. At this time, the spring function of the optical fiber rolls 126A exhibits a servo function by which the displacement of the solid load member 122 and the rigid plates 126B is stopped at a position where the spring force balances with the pressure applied from the load member 122 and the rigid plates 126B. On the other hand, because the solid load member 122 is displaced in the opposite direction to the direction of the arrow J, the pressure applied previously to the optical fiber rolls 127A of the sensors 127 reduces. The outputs from the optical fiber rolls 126A of the sensors 126 are averaged to obtain composite phase-shifted light $f_n$, and a phase difference $F_n$ between the composite phase-shifted light $f_n$ and the reference light is obtained. Similarly, the outputs from the optical fiber rolls 127A of the sensors 127 are averaged to obtain composite phase-shifted light $f_s$, and a phase difference $F_s$ between the composite phase-shifted light $f_s$ and the reference light is obtained. The acceleration applied in the Y-axis direction is measured from the difference $(F_n-F_s)$ between the phase differences $F_n$ and $F_s$.

Incidentally, the sensors 124 and 125 for the X-axis direction and the sensors 128 and 129 for the Z-axis direction are not displaced in directions in which the solid load member 122 and the rigid plates 124B, 125B, 128B and 129B for the X- and Z-axis directions press the sensors 124 and 125 for the X-axis direction and the sensors 128 and 129 for the Z-axis direction, but are displaced sidewardly with respect to the above-described sensors. Consequently, the same pressure is exerted on the sensors 124 and 125. Similarly, the same pressure is exerted on the sensors 128 and 129. Therefore, the outputs for the X-axis direction can be canceled by obtaining a difference between the output from the optical fiber rolls 124A of the sensors 124 for the direction X and the output from the optical fiber rolls 125A of the sensors 125 for the direction -X. Similarly, the outputs for the Z-axis direction can be canceled by obtaining a difference between the output from the optical fiber rolls 128A of the sensors 128 for the direction Z and the output from the optical fiber rolls 129A of the sensors 129 for the direction -Z.

Accordingly, in the measurement of acceleration applied in the Y-axis direction, composite phase-shifted light $f_n$ obtained by averaging the outputs from the optical fiber rolls 126A of the sensors 126 for the direction Y is inputted, together with the reference light, to the component detecting circuit 130-3 (see FIG. 13), and composite phase-shifted light $f_S$ obtained by averaging the outputs from the optical fiber rolls 127A of the sensors 127 for the direction -Y is inputted, together with the reference light, to the component detecting circuit 130-4 (FIG. 13). The component detecting circuit 130-3 obtains a phase difference $F_n$ (in the direction Y) between the composite phase-shifted light $f_n$ and the reference light. The component detecting circuit 130-4 obtains a phase difference $F_s$ (in the direction -Y) between the composite phase-shifted light $f_s$ and the reference light. The calculating section 132-2 in the data processing unit 132 obtains a difference $(F_n-F_s)$ between the phase differences $F_n$ and $F_s$ to measure the acceleration applied in the Y-axis direction.

As has been stated above, the same pressure is exerted on the optical fiber rolls of the sensors for the X-axis direction. Therefore, composite phase-shifted light $f_e$ is obtained by averaging the outputs from the optical fiber rolls 124A for the direction X, and the composite phase-shifted light $f_e$ and the reference light are inputted to the component detecting circuit 130-1 to obtain a phase difference Fe. Similarly, composite phase-shifted light $f_w$ is obtained by averaging the outputs from the optical fiber rolls 125A for the direction -X, and the composite phase-shifted light $f_w$ and the reference light are inputted to the component detecting circuits 130-2 to obtain a phase difference $F_w$. Similarly, the same pressure is exerted on the optical fiber rolls of the sensors for the Z-axis direction. Therefore, composite phase-shifted light $f_u$ obtained by averaging the outputs from the optical fiber rolls 128A of the sensors 128 for the direction Z is inputted, together with the reference light, to the component detecting circuits 130-5 to obtain a phase difference $F_u$, and composite phase-shifted light $f_d$ obtained by averaging the outputs from the optical fiber rolls 129A of the sensors 129 for the direction -Z is inputted, together with the reference light, to the component detecting circuit 130-6 to obtain a phase difference $F_d$. The phase differences $F_e$ and $F_w$ and the phase differences $F_u$ and $F_d$ are inputted to the data processing unit 132, and differences $(F_e-F_w)$ and $(F_u-F_d)$ are obtained in the calculating sections 32-1 and 32-3, respectively. Thus, the outputs for the X-axis direction are canceled, and so are the outputs for the Z-axis direction.

(6) Description of the measurement of acceleration in the Z-axis direction:

Referring to FIG. 12, when acceleration is applied in the Z-axis (vertical) direction, that is, from the direction of the arrow K, the solid load member 122 is displaced rapidly in the opposite direction to the direction of the arrow K, that is, upward, and the sensors 128 are also displaced rapidly together with the rigid plates 128B. Consequently, the resultant of a large pressure from the solid load member 122 and a pressure from each rigid plate 128B is surely transmitted and applied to the optical fiber rolls 128A of the sensors 128. At this time, the spring function of the optical fiber rolls 128A exhibits a servo function by which the displacement of the solid load member 122 and the rigid plates 128B is stopped at a position where the spring force balances with the pressure applied from the load member 122 and the rigid plates 128B. On the other hand, because the solid load member 122 is displaced in the opposite direction to the direction of the arrow K. the pressure applied previously to the optical fiber rolls 129A of the sensors 129 reduces.

Incidentally, the solid load member 122 and the rigid plates 124B, 125B, 126B and 127B for the X- and Y-axis directions are not displaced in the X- and Y-axis directions in which they press the sensors 124 and 125 for the X-axis direction and the sensors 126 and 127 for the Y-axis direction, but are displaced sidewardly with respect to the sensors 124, 125, 126 and 127 for the X- and Y-axis directions. Consequently, the same pressure is exerted on the sensors 124 and 125 for the X-axis direction. Similarly, the same pressure is exerted on the sensors 126 and 127 for the Y-axis direction. Therefore, the outputs for the X-axis direction can be canceled by obtaining a difference $(F_e-F_w)$ between a phase difference $F_e$ between the reference light and composite phase-shifted light $f_e$ obtained by averaging the outputs from the optical fiber rolls 124A of the sensors 124 for the direction X and a phase difference $F_w$ between the reference light and composite phase-shifted light $f_w$ obtained by averaging the outputs from the optical fiber rolls 125A of the sensors 125 for the direction -X. Similarly, the outputs for the Y-axis direction can be canceled by obtaining a difference $(F_n-F_s)$ between a phase difference $F_n$ between the reference light and composite phase-shifted light $f_n$ obtained by averaging the outputs from the optical fiber rolls 126A of the sensors 126 for the direction Y and a phase difference $F_s$ between the reference light and composite phase-shifted light $f_s$ obtained by averaging the outputs from the optical fiber rolls 127A of the sensors 127 for the direction −Y.

Accordingly, in the measurement of acceleration applied in the Z-axis direction, composite phase-shifted light $f_u$ obtained by averaging the outputs from the optical fiber rolls 128A of the sensors 128 for the direction Z is inputted, together with the reference light, to the component detecting circuit 130-5, and composite phase-shifted light $f_d$ obtained by averaging the outputs from the optical fiber rolls 129A of the sensors 129 for the direction −Z is inputted, together with the reference light, to the component detecting circuit 130-6, thereby obtaining a phase difference $F_u$ between the composite phase-shifted light $f_u$ and the reference light and a phase difference $F_d$ between the composite phase-shifted light $f_d$ and the reference light. Then, the calculating section 132-3 in the data processing unit 132 obtains a difference $(F_u-F_d)$ to calculate the acceleration applied in the Z-axis direction.

As has been stated above, the same pressure is exerted on the optical fiber rolls 124A and 125A of the sensors 124 and 125 for the X-axis direction. Therefore, composite phase-shifted light $f_e$ is obtained by averaging the outputs from the optical fiber rolls 124A of the sensors 124 for the direction X, and the composite phase-shifted light $f_e$ and the reference light are inputted to the component detecting circuit 130-1 to obtain a phase difference $F_e$. Similarly, composite phase-shifted light $f_w$ is obtained by averaging the outputs from the optical fiber rolls 125A of the sensors 125 for the direction −X, and the composite phase-shifted light $f_w$ and the reference light are inputted to the component detecting circuits 130-2 to obtain a phase difference $F_w$. Similarly, the same pressure is exerted on the optical fiber rolls 126A and 127A of the sensors 126 and 127 for the Y-axis direction. Therefore, composite phase-shifted light $f_n$ obtained by averaging the outputs from the optical fiber rolls 126A of the sensors 126 for the direction Y is inputted, together with the reference light, to the component detecting circuits 130-3 to obtain a phase difference $F_n$, and composite phase-shifted light $f_s$ obtained by averaging the outputs from the optical fiber rolls 127A of the sensors 127 for the direction −Y is inputted, together with the reference light, to the component detecting circuit 130-4 to obtain a phase difference $F_s$. The phase differences $F_e$ and $F_w$ and the phase differences $F_n$ and $F_s$ are inputted to the calculating sections 132-1 and 132-2, respectively, in the data processing unit 132 to obtain differences $(F_e-F_w)$ and $(F_n-F_s)$ Thus, the outputs for the X-axis direction are canceled, and so are the outputs for the Y-axis direction.

Figure 14:
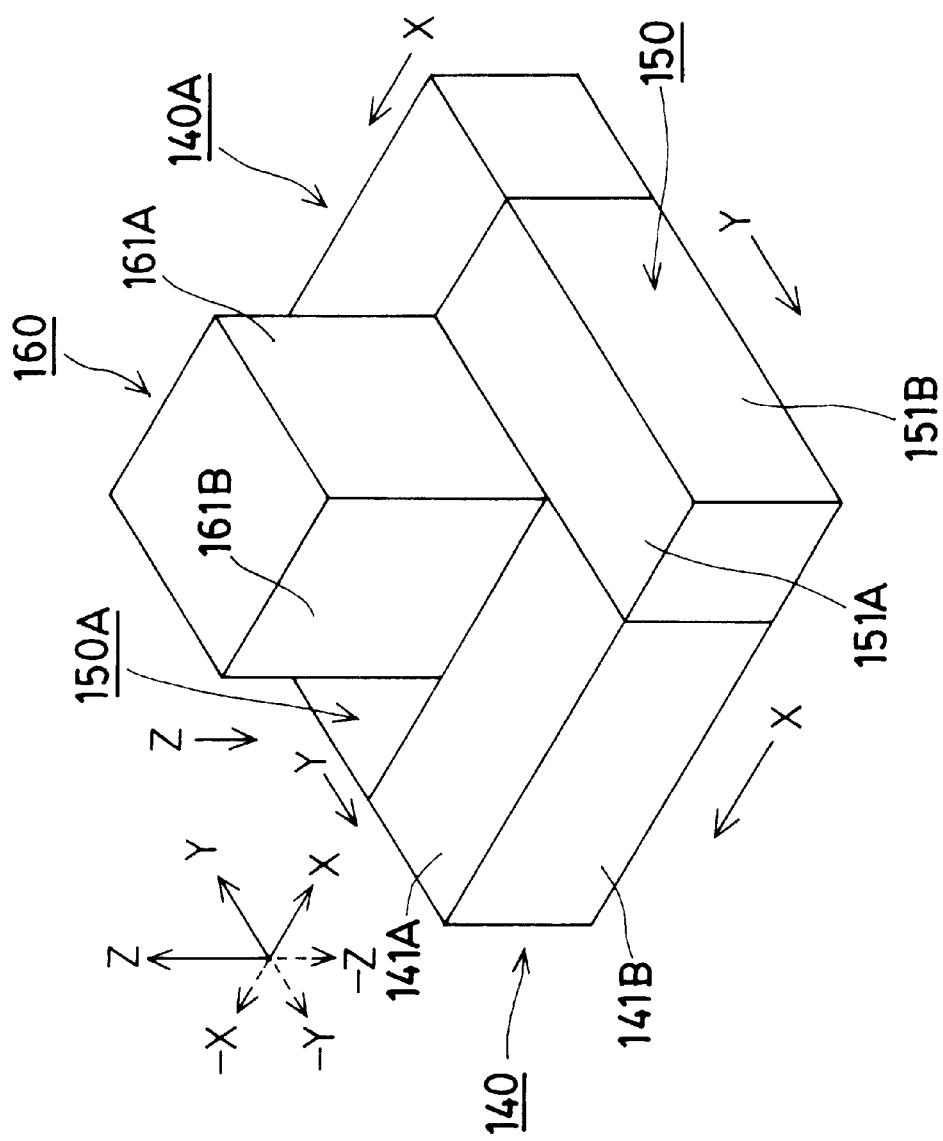
FIG. 14 is a perspective view of a seismometer having accelerometers (140, 140A, 150 and 150A) for two horizontal (X and Y) axis directions which are arranged in a double cross around an accelerometer (160) for a vertical (Z) axis direction.
Figure 15:
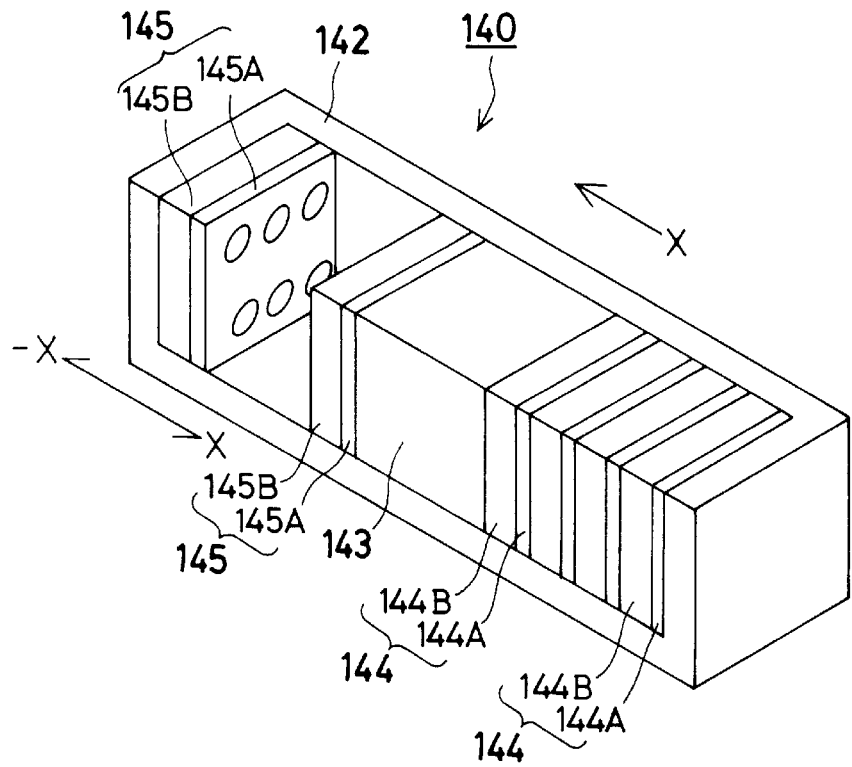
FIG. 15 is a perspective view of the X-direction accelerometer (140), showing the interior structure thereof with two side walls (141A and 141B) removed.
Figure 16:
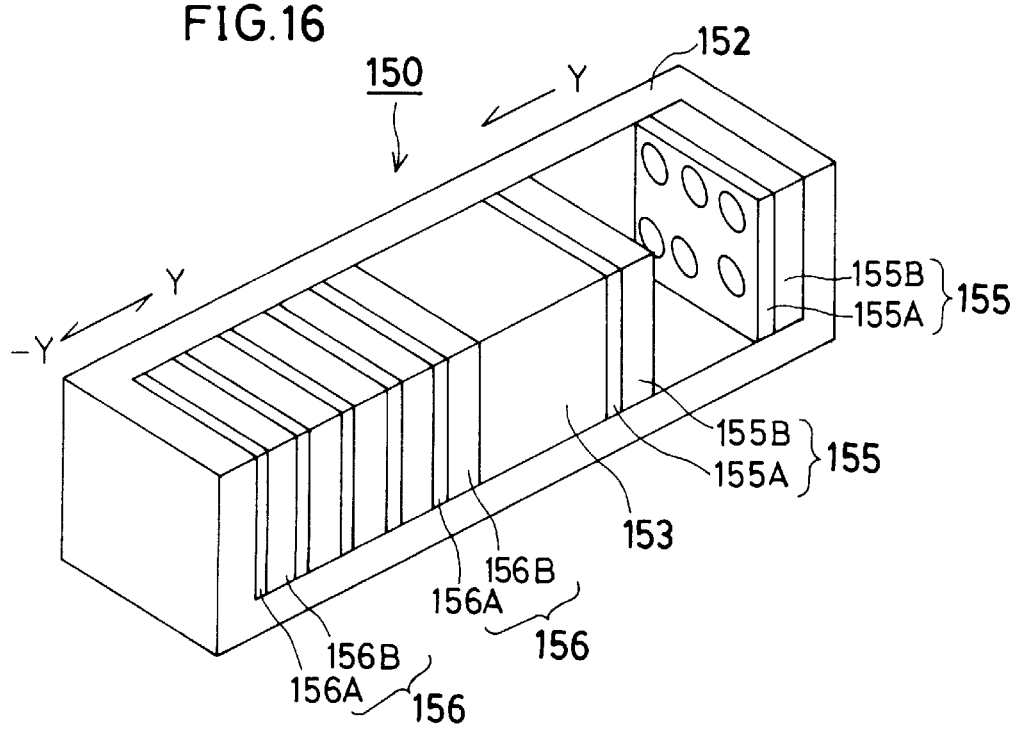
FIG. 16 is a perspective view of the Y-direction accelerometer (150), showing the interior structure thereof with two side walls (151A and 151B) removed.
Figure 17:
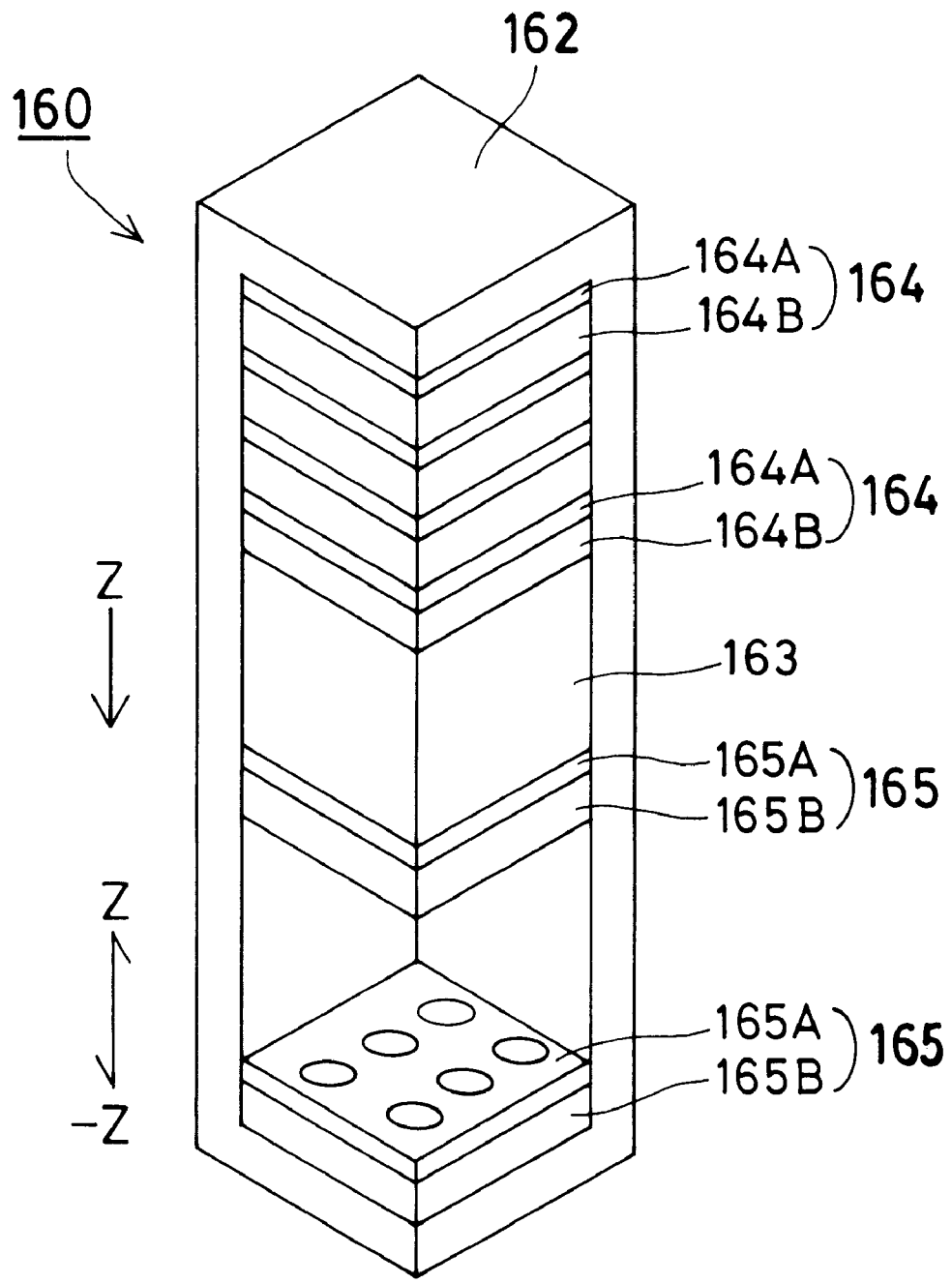
FIG. 17 is a perspective view of the Z-direction accelerometer (160), showing the interior structure thereof with two side walls (161A and 161B) removed.

The following is a description of a sixth embodiment of the seismometer according to the present invention that detects accelerations applied in two horizontal axis direction and a vertical axis direction. FIG. 14 is a perspective view of a seismometer having accelerometers 140, 140A, 150 and 150A for two horizontal (X and Y) axis directions which are arranged in a double cross around an accelerometer 160 for a vertical (Z) axis direction. FIG. 15 is a perspective view of the X-direction accelerometer 140, showing the interior structure thereof with two side walls 141A and 141B removed. FIG. 16 is a perspective view of the Y-direction accelerometer 150, showing the interior structure thereof with two side walls 151A and 151B removed. FIG. 17 is a perspective view of the Z-direction accelerometer 160, showing the interior structure thereof with two side walls 161A and 161B removed.

Referring to FIG. 14, the accelerometer 160 for detecting accelerations in two directions along a vertical (Z) axis has a rectangular sectional configuration and is fixed to a support base (not shown). On a pair of outer peripheral opposite surfaces of the lower part of the accelerometer 160, a pair of accelerometers 140 and 140A for detecting accelerations in two directions along a horizontal axis X, i.e. directions +X and −X, respectively, are disposed to face opposite to each other. On the other pair of outer peripheral opposite surfaces of the lower part of the accelerometer 160, a pair of accelerometers 150 and 150A for detecting accelerations in two directions along another horizontal axis Y, i.e. directions +Y and −Y, respectively, are disposed to face opposite to each other. The accelerometers 140, 140A, 150 and 150A are fixed to the support base in a double cross pattern.

(7) Description of the arrangement of the accelerometers for the X-, Y- and Z-axis directions:

Referring to FIG. 15, which shows the interior of the X-direction accelerometer 140 with the outer walls 141A and 141B removed, a hollow member 142 having a rectangular sectional configuration contains a solid load member 143 having a rectangular sectional configuration. The solid load member 143 is disposed in the center of the hollow member 142 in such a manner as to be displaceable in the direction of the longitudinal axis. A stack of force sensors 144 is disposed on one longitudinal end surface of the load member 143, and a stack of force sensors 145 is disposed on the other longitudinal end surface of the load member 143. The force sensors 144 have circular cylinder-shaped or meandrous optical fiber rolls 144A which are provided on rigid plates 144B, respectively, to face in the longitudinal direction. Similarly, the force sensors 145 have circular cylinder-shaped or meandrous optical fiber rolls 145A which are provided on rigid plates 145B, respectively, to face in the longitudinal direction. The optical fiber rolls 144A and 145A have the same functions as those of the foregoing optical fiber rolls. The force sensors 144 and 145 are stacked in equal numbers so that there is no play among the sensors.

Referring to FIG. 16, which shows the interior of the Y-direction accelerometer 150 with the outer walls 151A and 151B removed, a hollow member 152 having a rectangular sectional configuration contains a solid load member 153 having a rectangular sectional configuration as in the case of the accelerometer 140. The solid load member 153 is disposed in the center of the hollow member 152 in such a manner as to be displaceable in the direction of the longitudinal axis. A stack of force sensors 155 is disposed on one longitudinal end surface of the load member 153, and a stack of force sensors 156 is disposed on the other longitudinal end surface of the load member 153. The force sensors 155 have circular cylinder-shaped optical fiber rolls 155A which are provided on rigid plates 155B, respectively, to face in the longitudinal direction. Similarly, the force sensors 156 have circular cylinder-shaped optical fiber rolls 156A which are provided on rigid plates 156B, respectively, to face in the longitudinal direction. The force sensors 155 and 156 are stacked in equal numbers so that there is no play among the sensors.

It should be noted that the X-direction accelerometer 140A and the Y-direction accelerometer 150A are formed from the same constituent elements as those of the X-direction accelerometer 140 and the Y-direction accelerometer 150, respectively; therefore, a description thereof is omitted. Accordingly, when the constituent elements of the X-direction accelerometer 140A and the Y-direction accelerometer 150A are cited in the following description, the apostrophe will be put to reference numerals denoting the optical fiber rolls, force sensors, etc. of the X-direction accelerometer 140 and the Y-direction accelerometer 150.

Referring to FIG. 17, which shows the interior of the Z-direction accelerometer 160 with the outer walls 161A and 161B removed, a hollow member 162 having a rectangular sectional configuration contains a solid load member 163 having a rectangular sectional configuration. The solid load member 163 is disposed in the center of the hollow member 162 in such a manner as to be movable in the direction of the longitudinal axis. A stack of force sensors 164 is disposed on one longitudinal end surface of the load member 163, and a stack of force sensors 165 is disposed on the other longitudinal end surface of the load member 163. The force sensors 164 have circular cylinder-shaped optical fiber rolls 164A which are provided on rigid plates 164B, respectively, to face in the longitudinal direction. The force sensors 165 have circular cylinder-shaped optical fiber rolls 165A which are provided on rigid plates 165B, respectively, to face in the longitudinal direction. The force sensors 164 and 165 are stacked in equal numbers so that there is no play among the sensors.

It should be noted that the above-described circular cylinder-shaped optical fiber rolls 144A, 144A', 145A, 145A', 155A, 155A', 156A, 156A', 164A and 165A have the property that the light propagation characteristics thereof change when a pressure is applied thereto, and also have elasticity with which they function as springs and hence exhibit a servo function, as in the case of the optical fiber rolls 105A to 112A of the foregoing sensors 105 to 112.

Figure 18:
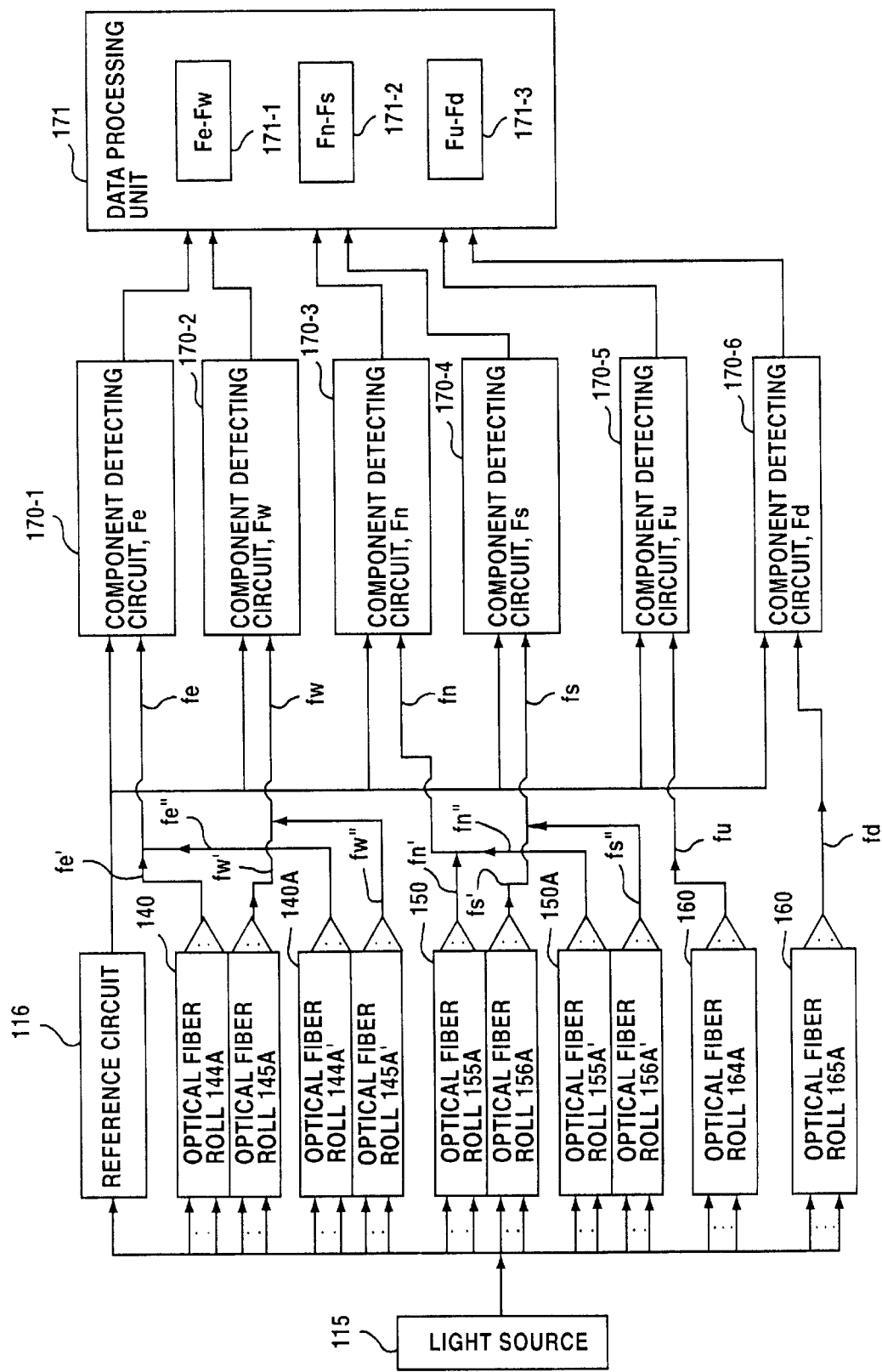
FIG. 18 is a diagram showing a data processing unit used in the seismometer shown in FIG. 14.

As will be clear from FIG. 18 which shows a measuring circuit, composite phase-shifted light $f_e'$ obtained by averaging at the exit side of the optical fiber rolls 144A in the X-direction accelerometer 140 and composite phase-shifted light $f_e''$ obtained by averaging at the exit side of the optical fiber rolls 144A' in the X-direction accelerometer 140A are further averaged to obtain a recomposed value $f_e$. The recomposed value $f_e$, together with the reference light, is inputted to a component detecting circuit 170-1. Similarly, composite phase-shifted light $f_w'$ obtained by averaging at the exit side of the optical fiber rolls 145A in the X-direction accelerometer 140 and composite phase-shifted light $f_w''$ obtained by averaging at the exit side of the optical fiber rolls 145A' in the X-direction accelerometer 140A are further averaged to obtain a recomposed value $f_w$. The recomposed value $f_w$, together with the reference light, is inputted to a component detecting circuit 170-2.

Further, composite phase-shifted light $f_n'$ obtained by averaging at the exit side of the optical fiber rolls 155A in the Y-direction accelerometer 150 and composite phase-shifted light $f_n''$ obtained by averaging at the exit side of the optical fiber rolls 155A' in the Y-direction accelerometer 150A are further averaged to obtain a recomposed value $f_n$. The recomposed value $f_n$, together with the reference light, is inputted to a component detecting circuit 170-3. Similarly, composite phase-shifted light $f_s'$ obtained by averaging at the exit side of the optical fiber rolls 156A in the Y-direction accelerometer 150 and composite phase-shifted light $f_s''$ obtained by averaging at the exit side of the optical fiber rolls 156A' in the Y-direction accelerometer 150A are further averaged to obtain a recomposed value $f_s$. The recomposed value $f_s$, together with the reference light, is inputted to a component detecting circuit 170-4.

Further, the outputs from the optical fiber rolls 164A and 165A in the Z-direction accelerometer 160 are averaged to form composite phase-shifted light $f_u$ and $f_d$, respectively. The composite phase-shifted light $f_u$, together with the reference light, is inputted to a component detecting circuit 170-5, and the composite phase-shifted light $f_d$, together with the reference light, is inputted to a component detecting circuit 170-6. It should be noted that split light from the light source 115 is individually incident on the optical fiber rolls in each of the force sensors for the X-, Y- and Z-axis directions.

Next, the operation of the accelerometers for the X-, Y- and Z-axis directions will be described with reference to FIG. 18 in the order in which accelerations in the X-, Y- and Z-axis directions are measured. In this case also, phase adjustment is made previously in the component detecting circuits 170-1 to 170-6 such that there is no phase difference between composite output light from each stack of optical fiber rolls and the reference light under no-acceleration conditions.

(8) Description of the measurement of acceleration in the X-axis direction:

As shown in FIG. 14, the accelerometers 140 and 140A for detecting acceleration in the X-axis direction and the accelerometers 150 and 150A for detecting acceleration in the Y-axis direction are disposed to face in the X- and Y-axis directions, respectively. As shown in FIG. 15, when acceleration is applied from the direction of the arrow X to the pair of accelerometers 140 and 140A for detecting acceleration in the X-axis direction, the solid load members 143 and 143' are displaced rapidly in the opposite direction to the direction of the arrow X, and the force sensors 144 and 144' are also displaced rapidly. Consequently, the resultant of a large pressure due to the displacement of the solid load members 143 and 143', which have a large mass, and a pressure from each of the rigid plates 144B and 144B' is surely transmitted and applied to the optical fiber rolls 144A and 144A' of the sensors 144 and 144'. At this time, the spring function of the optical fiber rolls 144A and 144A' exhibits a servo function by which the displacement of the load member 143 and the rigid plates 144B and the displacement of the load member 143' and the rigid plates 144B' are stopped at respective positions where the spring forces balance with the pressure applied from the load members and the rigid plates. On the other hand, because the load members 143 and 143' are displaced in the opposite direction to the direction of the arrow X shown in FIG. 15, the pressure applied previously to the optical fiber rolls 145A and 145A' of the sensors 145 and 145' reduces.

Incidentally, the load members 153 and 153' and the rigid plates 155B, 155B', 156B and 156B' for the Y-axis direction are not displaced in a direction in which they press the optical fiber rolls 155A, 155A', 156A and 156A' in the accelerometers 150 and 150A for the Y-axis direction. Therefore, the same pressure is exerted on the abovementioned optical fiber rolls. Similarly, the load member 163 and the rigid plates 164B and 165B for the Z-axis direction are not displaced in a direction in which they press the optical fiber rolls 164A and 165A in the accelerometer 160 for the Z-axis direction. Therefore, the same pressure is exerted on the optical fiber rolls 164A and 165A.

Accordingly, composite phase-shifted light $f_e'$ obtained by averaging the output light from the optical fiber rolls 144A facing toward the direction X in the accelerometer 140 for the X-axis direction and composite phase-shifted light $f_e''$ obtained by averaging the output light from the optical fiber rolls 144A' facing toward the direction X in the accelerometer 140A for the X-axis direction are further averaged to obtain a recomposed value $f_e$. The recomposed value $f_e$, together with the reference light, is inputted to the component detecting circuit 170-1. The component detecting circuit 170-1 obtains a phase difference $F_e$ between the reference light and the recomposed value $f_e$ obtained by averaging the composite phase-shifted light $f_e'$ and $f_e''$, which are obtained from the optical fiber rolls 144A and 144A' facing toward the direction X.

In addition, composite phase-shifted light $f_w'$ obtained by averaging the output light from the optical fiber rolls 145A facing toward the direction −X and composite phase-shifted light $f_w''$ obtained by averaging the output light from the optical fiber rolls 145A' facing toward the direction −X are further averaged to obtain a recomposed value $f_w$. The recomposed value $f_w$, together with the reference light, is inputted to the component detecting circuit 170-2. The component detecting circuit 170-2 obtains a phase difference $F_w$ between the reference light and the recomposed value $f_w$ obtained by averaging the composite phase-shifted light $f_w'$ and $f_w''$, which are obtained from the optical fiber rolls 145A and 145A' facing toward the direction −X. The phase differences $F_e$ and $F_w$ are inputted to a calculating section 171-1 in a data processing unit 171 to obtain a difference $(F_e-F_w)$ between the phase differences $F_e$ and $F_w$, thereby measuring the acceleration applied in the X-axis direction.

On the other hand, when acceleration is applied in the X-axis direction, the load members 153 and 153' and the rigid plates 155B, 155B', 156B and 156B' in the accelerometers 150 and 150A for the Y-axis direction are not displaced in a direction in which they press the optical fiber rolls 155A, 155A', 156A and 156A' in the accelerometers 150 and 150A for the Y-axis direction, as stated above. Similarly, the load member 163 and the rigid plates 164B and 165B for the Z-axis direction are not displaced in a direction in which they press the optical fiber rolls 164A and 165A in the accelerometer 160 for the Z-axis direction. Therefore, the same pressure is exerted on the optical fiber rolls of the sensors 155, 155', 156 and 156'. Similarly, the same pressure is exerted on the optical fiber rolls of the sensors 164 and 165.

Accordingly, composite phase-shifted light $f_n'$ obtained by averaging the outputs from the optical fiber rolls 155A facing the direction Y and composite phase-shifted light $f_n''$ obtained by averaging the outputs from the optical fiber rolls 155A' facing the direction Y are further averaged to obtain a recomposed value $f_n$. The recomposed value $f_n$, together with the reference light, is inputted to the component detecting circuit 170-3. Similarly, composite phase-shifted light $f_s'$ obtained by averaging the outputs from the optical fiber rolls 156A facing the direction −Y and composite phase-shifted light $f_s''$ obtained by averaging the outputs from the optical fiber rolls 156A' facing the direction −Y are further averaged to obtain a recomposed value $f_s$. The recomposed value fin together with the reference light, is inputted to the component detecting circuit 170-4. The component detecting circuit 170-3 outputs a phase difference $F_n$ between the reference light and the recomposed value $f_n$ obtained by averaging the outputs from the optical fiber rolls 155A and 155A'. The component detecting circuit 170-4 outputs a phase difference $F_s$ between the reference light and the recomposed value $f_s$ obtained by averaging the outputs from the optical fiber rolls 156A and 156A'. The outputs $F_n$ and $F_s$ are inputted to a calculating section 171-2 in the data processing unit 171 to obtain a difference $(F_n-F_s)$ between the outputs $F_n$ and $F_s$, thereby canceling the outputs for the Y-axis direction.

Similarly, the component detecting circuit 170-5 obtains a phase difference $F_u$ between the reference light and composite phase-shifted light $f_u$ obtained from the optical fiber rolls 164A. The component detecting circuit 170-6 obtains a phase difference $F_d$ between the reference light and composite phase-shifted light $f_d$ obtained from the optical fiber rolls 165A. The phase difference outputs $F_u$ and $F_d$ are inputted to a calculating section 171-3 in the data processing unit 171 to obtain a difference $(F_u-F_d)$ between the outputs $F_u$ and $F_d$. Thus, the outputs for the Z-axis direction are canceled.

(9) Description of the measurement of acceleration in the Y-axis direction:

The following is a description of the detection of acceleration applied in the direction of the arrow Y shown in FIGS. 14 and 16. When acceleration is applied from the direction of the arrow Y as shown in FIG. 16 to the accelerometers 150 and 150A for detecting acceleration in the Y-axis direction, the solid load members 153 and 153' are displaced rapidly in the opposite direction to the direction of the arrow Y, and the force sensors 155 and 155' are also displaced rapidly. Consequently, the resultant of a large pressure due to the displacement of the solid load members 153 and 153', which have a large mass, and a pressure from each of the rigid plates 155B and 155B' is surely transmitted and applied to the optical fiber rolls 155A and 155A' of the sensors 155 and 155'. At this time, the spring function of the optical fiber rolls 155A and 155A' exhibits a servo function or a feedback function by which the displacement of the load member 153 and the rigid plates 155B and the displacement of the load member 153' and the rigid plates 155B' are stopped at respective positions where the spring forces balance with the pressure applied from the load members and the rigid plates. On the other hand, because the load members 153 and 153' are displaced in the opposite direction to the direction of the arrow Y, the pressure applied previously to the optical fiber rolls 156A and 156A' of the sensors 156 and 156' reduces.

Incidentally, the load members 143 and 143' in the accelerometers 140 and 140A for the X-axis direction and the rigid plates 144B, 144B', 145B and 145B' for the X-axis direction are not displaced in a direction in which they press the sensors 144, 144', 145 and 145' in the accelerometers 140 and 140A. Similarly, the load member 163 in the accelerometer 160 for the Z-axis direction and the rigid plates 164B and 165B for the Z-axis direction are not displaced in a direction in which they press the sensors 164 and 165 in the accelerometer 160.

Therefore, the same pressure is exerted on the optical fiber rolls 144A, 144A', 145A and 145A' in the accelerometers 140 and 140A for the X-axis direction. Similarly, the same pressure is exerted on the optical fiber rolls 164A and 165A in the accelerometer 160 for the Z-axis direction.

Accordingly, in the measurement of acceleration in the Y-axis direction, composite phase-shifted light $f_n'$ obtained from the optical fiber rolls 155A in the accelerometer 150 for the Y-axis direction and composite phase-shifted light $f_n''$ obtained from the optical fiber rolls 155A' in the accelerometer 150A for the Y-axis direction are further averaged to obtain a recomposed value $f_n$ at the output side. The recomposed value $f_n$, together with the reference light, is inputted to the component detecting circuit 170-3. In addition, composite phase-shifted light $f_s'$ obtained from the optical fiber rolls 156A in the accelerometer 150 for the Y-axis direction and composite phase-shifted light $f_s''$ obtained from the optical fiber rolls 156A' in the accelerometer 150A for the Y-axis direction are further averaged to obtain a recomposed value $f_s$ at the output side. The recomposed value $f_s$, together with the reference light, is inputted to the component detecting circuit 170-4.

The component detecting circuit 170-3 obtains a phase difference $F_n$ in the direction Y between the reference light and the recomposed value $f_n$ obtained by averaging the composite phase-shifted light $f_n'$ and $f_n''$, which are obtained from the optical fiber rolls 155A and 155A'. The component detecting circuit 170-4 obtains a phase difference $F_s$ in the direction -Y between the reference light and the recomposed value $f_s$ obtained by averaging the composite phase-shifted light $f_s'$ and $f_s"$, which are obtained from the optical fiber rolls 156A and 156A'. The phase difference outputs $F_n$ and $F_s$ are inputted to the data processing unit 171, and a difference ($F_n-F_s$) between the phase difference outputs $F_n$ and $F_s$ is obtained in the calculating section 171-2 in the data processing unit 171, thereby obtaining the acceleration applied in the Y-axis direction.

On the other hand, the same pressure is exerted on the sensors 144, 144', 145 and 145' in the accelerometers 140 and 140A for the X-axis direction, and the same pressure is exerted on the sensors 164 and 165 for the Z-axis direction, as stated above. Therefore, composite phase-shifted light $f_e'$ obtained from the optical fiber rolls 144A in the accelerometer 140 for the X-axis direction and composite phase-shifted light $f_e"$ obtained from the optical fiber rolls 144A' in the accelerometer 140A for the X-axis direction are averaged to obtain a recomposed value $f_e$. The recomposed value $f_e$ together with the reference light, is inputted to the component detecting circuit 170-1 to obtain a phase difference $F_e$. Further, composite phase-shifted light $f_w'$ obtained from the optical fiber rolls 145A in the accelerometer 140 for the X-axis direction and composite phase-shifted light $f_w"$ obtained from the optical fiber rolls 145A' in the accelerometer 140A for the X-axis direction are averaged to obtain a recomposed value $f_w$. The recomposed value $f_w$, together with the reference light, is inputted to the component detecting circuit 170-2 to obtain a phase difference $F_w$. Similarly, composite phase-shifted light $f_u$ obtained from the optical fiber rolls 164A in the accelerometer 160 for the Z-axis (vertical) direction, together with the reference light, is inputted to the component detecting circuit 170-5 to obtain a phase difference $F_u$. Further, composite phase-shifted light $f_d$ obtained from the optical fiber rolls 165A in the accelerometer 160, together with the reference light, is inputted to the component detecting circuit 170-6 to obtain a phase difference $F_d$. The phase difference outputs $F_e$ and $F_w$ are inputted to the calculating section 171-1 in the data processing unit 171 to obtain a difference ($F_e-F_w$) between the outputs $F_e$ and $F_w'$. Thus, the outputs for the X-axis direction are canceled. Similarly, the phase difference outputs $F_u$ and $F_d$ are inputted to the calculating section 171-3 in the data processing unit 171 to obtain a difference ($F_u-F_d$) between the outputs $F_u$ and $F_d$. Thus, the outputs for the Z-axis direction are canceled.

(10) Description of the measurement of acceleration in the Z-axis direction:

Next, the detection of acceleration applied in the direction of the arrow Z shown in FIG. 14 will be described with reference to FIG. 17. When acceleration is applied from the direction of the arrow Z as shown in FIG. 17 to the accelerometer 160 for detecting acceleration in the Z-axis direction, the load member 163 is displaced rapidly in the opposite direction to the direction of the arrow Z, and the sensors 164 are also displaced rapidly. Consequently, the resultant of a large pressure due to the displacement of the load member 163, which has a large mass, and a pressure from each of the rigid plates 164B is surely transmitted and applied to the optical fiber rolls 164A of the sensors 164. At this time, the spring function of the optical fiber rolls 164A exhibits a servo function by which the displacement of the load member 163 and the rigid plates 164B is stopped at a position where the spring force balances with the pressure applied from the load member 163 and the rigid plates 164B.

On the other hand, because the load member 163 is displaced in the opposite direction to the direction of the arrow Z, the pressure applied previously to the optical fiber rolls 165A of the sensors 165 reduces.

Therefore, composite phase-shifted light $f_u$ obtained from the optical fiber rolls 164A in the accelerometer 160 for the Z-axis direction is inputted to the component detecting circuit 170-5, together with the reference light, to obtain a phase difference $F_u$ between the composite phase-shifted light $f_u$ and the reference light. Similarly, composite phase-shifted light $f_d$ obtained from the optical fiber rolls 165A in the accelerometer 160 for the Z-axis direction is inputted to the component detecting circuit 170-6, together with the reference light, to obtain a phase difference $F_d$ between the composite phase-shifted light $f_d$ and the reference light. The phase differences $F_u$ and $F_d$ are inputted to the calculating section 171-3 in the data processing unit 171 to obtain a difference ($F_u-F_d$) between the phase differences $F_u$ and $F_d$, thereby detecting the acceleration applied in the Z-axis direction.

Incidentally, when acceleration is applied in the Z-axis direction, the load members 143 and 143' in the accelerometers 140 and 140A for the X-axis direction and the rigid plates 144B, 144B', 145B and 145B' for the X-axis direction are not displaced in a direction in which they press the sensors 144, 144', 145 and 145' in the accelerometers 140 and 140A. Similarly, the load members 153 and 153' in the accelerometers 150 and 150A for the Y-axis direction and the rigid plates 155B, 155B', 156B and 156B' for the Y-axis direction are not displaced in a direction in which they press the sensors 155, 155', 156 and 156' in the accelerometers 150 and 150A. Therefore, the same pressure is exerted on the optical fiber rolls 144A, 145A, 144A' and 145A' in the accelerometers 140 and 140A for the X-axis direction. Similarly, the same pressure is exerted on the optical fiber rolls 155A, 156A, 155A' and 156A' in the accelerometers 150 and 150A for the Y-axis direction. Therefore, composite phase-shifted light $f_e'$ obtained from the optical fiber rolls 144A in the accelerometer 140 for the X-axis direction and composite phase-shifted light $f_e"$ obtained from the optical fiber rolls 144A' in the accelerometer 140A for the X-axis direction are averaged to obtain a recomposed value $f_e$. The recomposed value $f_e$, together with the reference light, is inputted to the component detecting circuit 170-1 to obtain a phase difference $F_e$. Further, composite phase-shifted light $f_w'$ obtained from the optical fiber rolls 145A in the accelerometer 140 for the X-axis direction and composite phase-shifted light $f_w"$ obtained from the optical fiber rolls 145A' in the accelerometer 140A for the X-axis direction are averaged to obtain a recomposed value $f_w$. The recomposed value $f_w$, together with the reference light, is inputted to the component detecting circuit 170-2 to obtain a phase difference $F_w$.

On the other hand, composite phase-shifted light $f_n'$ obtained from the optical fiber rolls 155A in the accelerometer 150 for the Y-axis direction and composite phase-shifted light $f_n"$ obtained from the optical fiber rolls 155A' in the accelerometer 150A for the Y-axis direction are averaged to obtain a recomposed value $f_n$. The recomposed value $f_n$, together with the reference light, is inputted to the component detecting circuit 170-3 to obtain a phase difference $F_n$. Further, composite phase-shifted light $f_s'$ obtained from the optical fiber rolls 156A in the accelerometer 150 for the Y-axis direction and composite phase-shifted light $f_s"$ obtained from the optical fiber rolls 156A' in the accelerometer 150A for the Y-axis direction are averaged to obtain a recomposed value $f_s$. The recomposed value $f_s$, together with the reference light, is inputted to the component detecting circuit 170-4 to obtain a phase difference $F_s$.

The phase differences $F_e$ and $F_w$ are inputted to the calculating section 171-1 in the data processing unit 171 to obtain a difference ($F_e-F_w$) between the phase differences $F_e$ and $F_w$, thereby canceling the outputs for the X-axis direction. Similarly, the phase differences $F_n$ and $F_s$ are inputted to the calculating section 171-2 in the data processing unit 171 to obtain a difference ($F_n-F_s$) between the phase differences $F_n$ and $F_s$, thereby canceling the outputs for the Y-axis direction.

Figure 19:
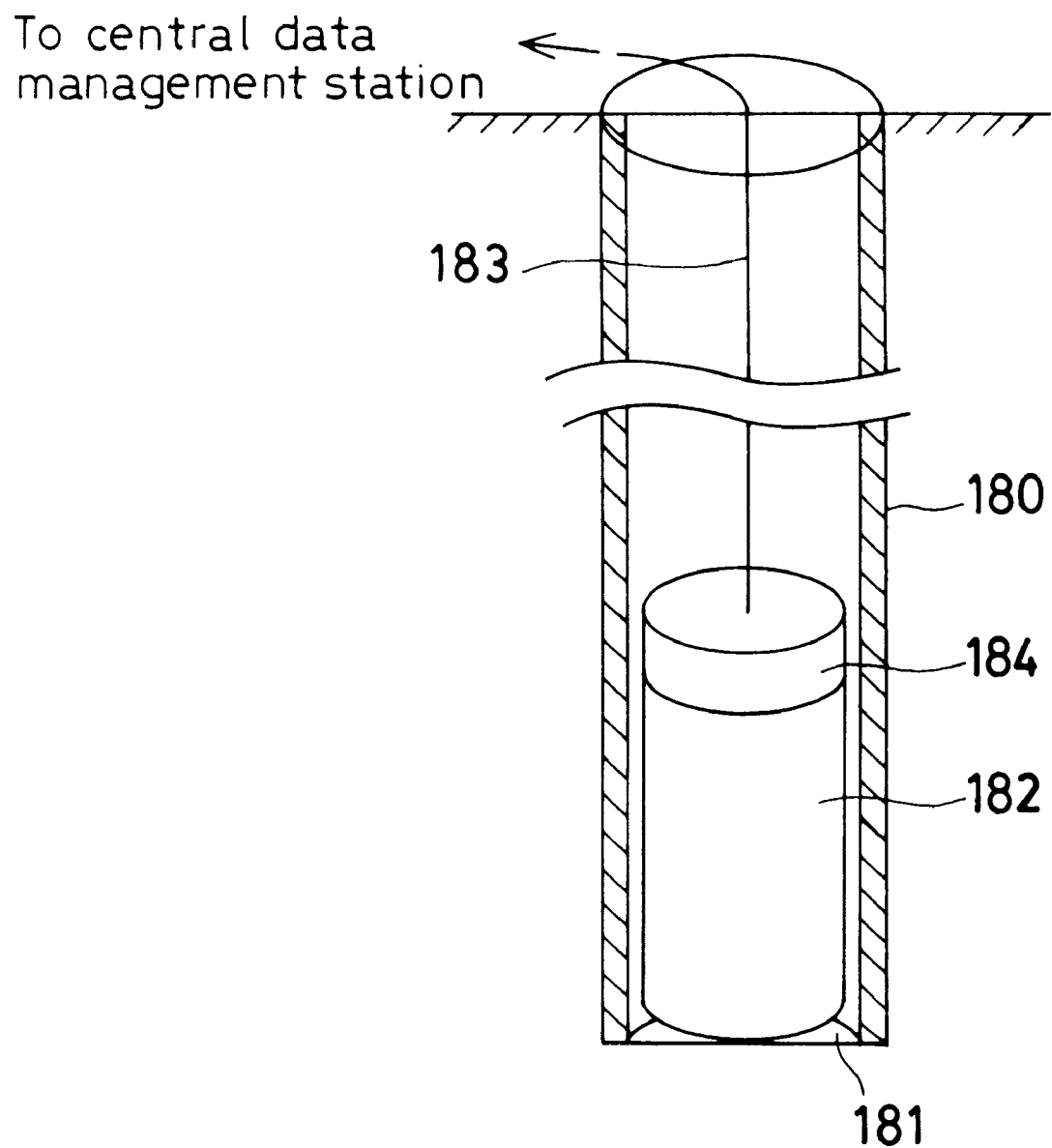
FIG. 19 ii a diagram showing the arrangement of a seismic observation system in which a seismometer according to the present invention is installed in a borehole dug in the ground.

A seismometer according to the present invention may be installed as shown in FIG. 19. More specifically, a borehole 180 is dug in the ground to the depth of the order of 30 meters or more, at which temperature change is mostly negligible. A circular cylinder-shaped container 182 is fixed to the bottom 181 of the borehole 180, and a three-component seismometer as shown in FIGS. 10 to 12, described above, is fixedly disposed in the container 182. Alternatively, a combination of a seismometer capable of measuring two horizontal components and a seismometer capable of measuring a vertical component is fixedly disposed in the container 182. Data collected by the seismometers is transmitted to a central data management station on the ground through a signal line 183 to make seismic observations. It is desirable that the phase data concerning optical signals from the seismometer should be sent out to the central data management station after being converted into three-component earthquake motion data in the borehole 180 by, for example, a data processing transmission unit 184 installed directly above the seismometer. In this case, accurate observation information can be transmitted to the central data management station because the optical fiber rolls installed in the container 182 are capable of measuring accelerations independently of variations in the ambient temperature.

It should be noted that when circular cylinder-shaped or meandrous optical fiber rolls are provided on rigid plates of force sensors employed in the fourth to sixth embodiments of the present invention, the optical fiber rolls are preferably secured to the rigid plates by molding using a synthetic resin material having a slightly higher rigidity than that of the optical fiber rolls (e.g. rigid plastics or glass material). By doing so, noise(s) can be reduced, and thus the SN ratio can be improved.

Figure 20A:
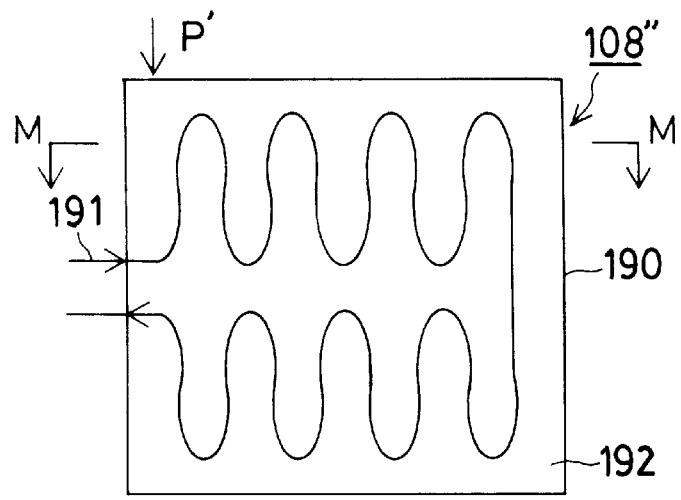
Figure 20B:
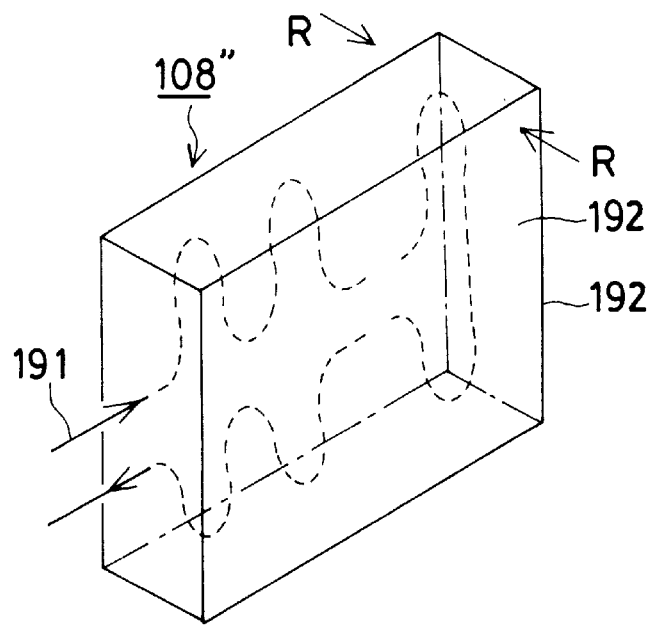
Figure 20C:
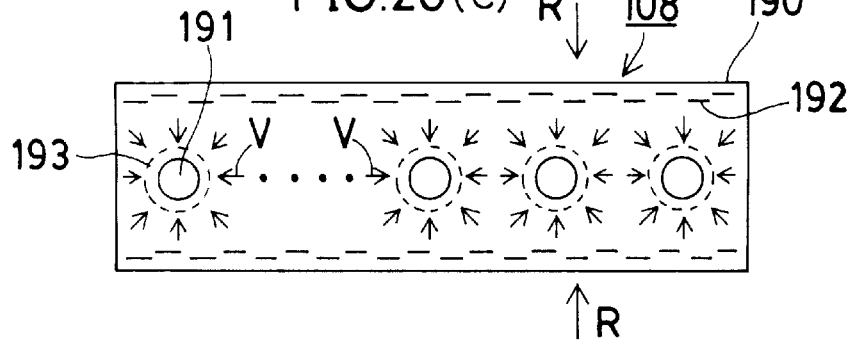

The force sensors having optical fiber rolls secured by molding may be replaced by force sensors each having a meandrous optical fiber roll immersed in a viscous liquid filled in a rectangular bag member, for example. Such force sensors will be described below with reference to FIGS. 20(A), 20(B) and 20(C). FIG. 20(A) is a plan view of a force sensor 108" whose interior is seen through a bag member 190. FIG. 20(B) is a perspective view of the force sensor 108", in which an optical fiber roll is seen through the bag member 190. In FIG. 20(B), the configuration of a meandrous optical fiber cable in the bag member 190 is shown in a sawtooth form by the dotted line for explanatory simplicity. FIG. 20(C) is a sectional view of the force sensor 108" taken along the line M—M in FIG. 20(A) and seen from the direction of the arrow P', showing an optical fiber roll 191 in a state where stress is applied thereto in the directions of lines normal to the outer peripheral surface of the optical fiber roll 191.

Referring to FIG. 20(A), a rectangular bag member 190 formed from vinyl or other similar material is filled with a viscous liquid 192, e.g. silicone, having a volume approximately equal to the internal volume of the bag member 190 so that when an external pressure is applied to the bag member 190, the viscous liquid 192 applies a hydrostatic pressure to the optical fiber roll 191 in the bag member 190 without applying (dynamic) shear stresses thereto. The optical fiber roll 191 is coated with a coating material set so as to retain the meandrous shape. The meandrous optical fiber roll 191 is immersed in the viscous liquid 192 in the bag member 190.

As illustrated in FIG. 20(B), which shows the meandrous optical fiber roll 191 in a sawtooth shape for explanatory simplicity, a load member and a rigid plate are disposed on the obverse and reverse sides of the bag member 190, i.e. the surfaces indicated by the arrows R. As shown in FIG. 20(C), when the load member and the rigid plate are displaced to apply an external pressure uniformly to the obverse and reverse sides of the bag member 190 from the directions of the arrows R, the viscous liquid 192 in the bag member 190 can hardly flow and therefore produces no dynamic pressure. Accordingly, the viscous liquid 192 applies not (dynamic) shear stresses but a hydrostatic pressure to the optical fiber roll 191. Consequently, stress is applied uniformly to the whole outer peripheral surface of the optical fiber roll 191 from the directions of lines normal to the outer peripheral surface as shown by the arrows V. Thus, the sectional area of the optical fiber roll 191 is reduced uniformly from the dotted-line position to the solid-line position. Therefore, a change in the external pressure can be converted into a change in the axial length of the optical fiber cable, and hence the external pressure can be measured on the basis of the change of the light propagation characteristics. Because the sectional area of the optical fiber cable can be varied uniformly and the change in the sectional area can be converted into a change in the axial length of the cable, all changes in the pressure applied to the optical fiber roll are converted into changes in the axial length of the optical fiber roll. Therefore, phase shifts can be measured smoothly, and measuring resolution and accuracy improve.

Figure 21:
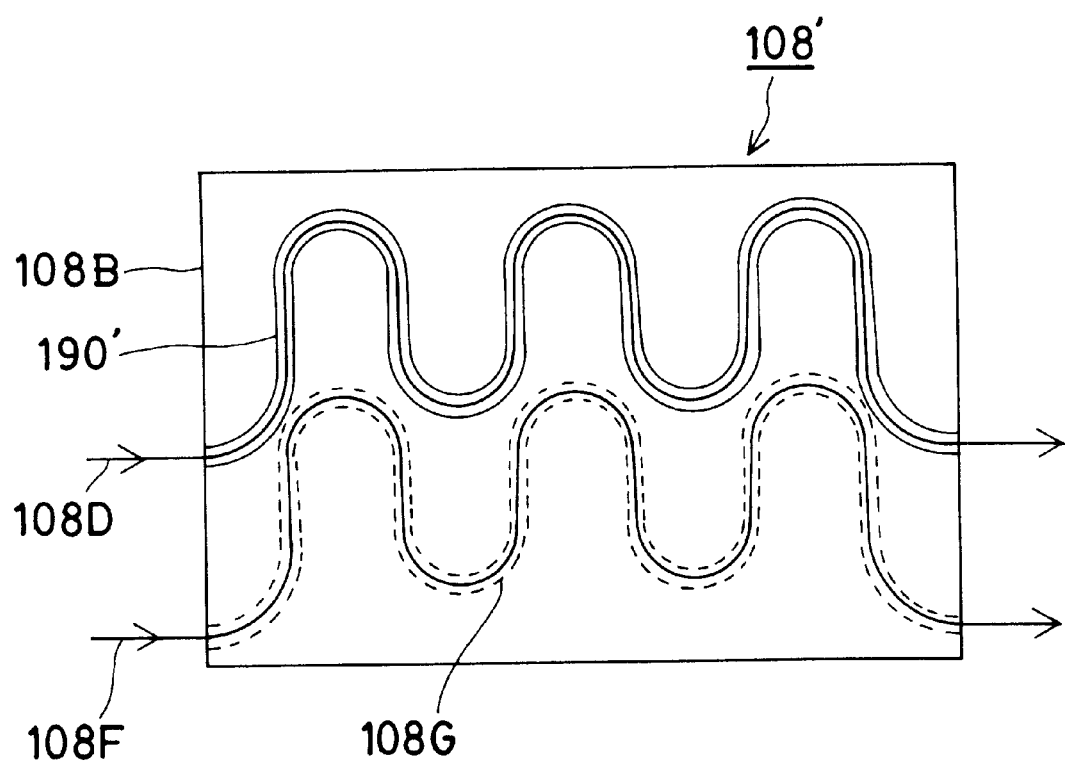
FIG. 21 is a plan view of an arrangement in which an optical fiber roll (108D) for measurement and an optical fiber roll (108F) for reference are provided on the same rigid plate and placed under the same temperature conditions for the purpose of improving the measuring accuracy.

The following is a description of an embodiment in which an optical fiber roll for measurement and an optical fiber roll for reference are provided on the same rigid plate in a side-by-side relation to each other, and the two optical fiber rolls are placed under the same ambient conditions, thereby improving the measuring accuracy. As shown in FIG. 21, reference light emanating from, for example, the reference circuit 116 shown in FIG. 13 is distributed to the number of optical fiber rolls 108F for reference that is equal to the number of rigid plates, and each of the reference optical fiber rolls 108F and an optical fiber roll 108D for measurement are paired and disposed in close proximity to each other on a rigid plate 108B shown as a typical example in FIG. 8(D).

More specifically, the measurement optical fiber roll 108D and the reference optical fiber roll 108F, which have the same shape and length and which are supplied with light having the same light intensity, are disposed in close proximity to each other on the rigid plate 108B of the force sensor 108'. As has been described in connection with FIGS. 20(A) to 20(C), the measurement optical fiber roll 108D is immersed in a viscous liquid filled in a bag member 190' with a circular sectional configuration in an amount sufficient to prevent the bag member 190' from being deformed when an external pressure is applied thereto. When an external pressure is applied to the bag member 190', a hydrostatic pressure, but not (dynamic) shear stresses, are applied to the measurement optical fiber roll 108D. Consequently, the diametrical dimension of the optical fiber roll 108D reduces, and the longitudinal dimension thereof elongates. On the other hand, the reference optical fiber rolls 108F is accommodated in a tubular member 108G having the same diameter as that of the bag member 190' and further having a sufficiently high rigidity to prevent the tubular member 108G from being deformed when a pressure is applied thereto.

Thus, the measurement optical fiber roll 108D and the reference optical fiber rolls 108F are disposed in close proximity to each other on the rigid plate 108B, and the two fiber rolls 108D and 108F are placed under the same ambient thermal condition, thereby enabling the measuring accuracy to improve.

Incidentally, the X- and Y-axis direction accelerometers of the above-described seismometer according to the present invention do not always need to be disposed to face north, south, east and west, but can be disposed at any desired azimuth angles. In such a case, the measured accelerations are corrected by vector computation to detect accelerations applied from the north, south, east and west directions. The seismometer according to the present invention can be used not only at the surface of the earth but also at other places such as the bottom of the sea, the bottom of a lake, and the solid surface of a planet or satellite. It is also possible to mount the seismometer according to the present invention on rockets, artificial satellites, gyroscopes, railroad cars, bullet trains, privately-owned cars, etc.

According to the present invention, applied accelerations can be detected by using not only the above-described phase shift data but also data indicating changes in the intensity of forward scattering light or back scattering light, or changes in the intensity of transmitted light and executing data processing as described above. In this case, there is no need of phase comparison with reference light, which is used in the foregoing phase shift data processing. As has been stated above, velocity data and displacement data can be obtained by integrating data obtained from the accelerometer. Therefore, in this sense, the accelerometer according to the present invention can be regarded as a seismometer.

What we claim is:

1. A two-component measuring seismometer comprising:
   a hollow rectangular prism-shaped load member;
   a rectangular cylinder-shaped load member disposed inside said hollow rectangular prism-shaped load member with gaps therebetween;
   a solid rectangular prism-shaped load member disposed inside said rectangular cylinder-shaped load member with gaps therebetween;
   stacks of force sensors respectively disposed in four gaps across which said hollow rectangular prism-shaped load member and rectangular cylinder-shaped load member face opposite to each other and in four gaps which face opposite to said four gaps across said rectangular cylinder-shaped load member and across which said rectangular cylinder-shaped load member and solid rectangular prism-shaped load member face opposite to each other, said force sensors each having a circular cylinder-shaped or meandrous optical fiber roll provided on a rigid plate, said optical fiber roll having light propagation characteristics which change in response to a change in pressure applied thereto, which is caused by relative displacement between said load members due to application of acceleration, thus causing a phase of light transmitted through said optical fiber roll to be shifted, and said optical fiber roll having a smaller elastic constant than those of said load members and rigid plate, said stacks of force sensors being positioned to face toward four directions, respectively, of two orthogonal horizontal (X and Y) axes; and
   a data processing unit that calculates acceleration applied in a direction of displacement of said solid rectangular prism-shaped load member on the basis of a difference between two phase difference outputs, one of which is obtained by determining a phase difference between reference light and composite phase-shifted light obtained by averaging output light from the optical fiber rolls of the force sensors provided for one direction of one of the two orthogonal horizontal (X and Y) axes along which said load members are displaced relative to each other at an exit side of said optical fiber rolls, the other of said two phase difference outputs being obtained by determining a phase difference between the reference light and composite phase-shifted light obtained by averaging output light from the optical fiber rolls of the force sensors provided for the other direction of said one of the two orthogonal horizontal (X and Y) axes at an exit side of said optical fiber rolls.

2. A three-component measuring seismometer, comprising:
   a hollow rectangular prism-shaped load member;
   a solid rectangular prism-shaped load member disposed inside said hollow rectangular prism-shaped load member with gaps therebetween;
   stacks of force sensors respectively disposed in six gaps across which said hollow rectangular prism-shaped load member and solid rectangular prism-shaped load member face opposite each other, said force sensors each having a circular cylinder-shaped or meandrous optical fiber roll provided on a rigid plate, said optical fiber roll having light propagation characteristics which change in response to a change in pressure applied thereto, which is caused by relative displacement between said load members due to application of acceleration, thus causing a phase of light transmitted through said optical fiber roll to be shifted, and said optical fiber roll having a smaller elastic constant than those of said load members and rigid plate, said stacks of force sensors being positioned to face toward, respectively, four directions of two horizontal (X and Y) axes and two directions of a vertical (Z) axis of an orthogonal coordinate system; and
   a data processing unit that calculates acceleration applied in a direction of displacement of said solid rectangular prism-shaped load member on the basis of a difference between two phase difference outputs, one of which is obtained by determining a phase difference between reference light and composite phase-shifted light obtained by averaging output light from the optical fiber rolls of the force sensors provided for one direction of one of the three (X, Y and Z) axes along which said load members are displaced relative to each other at an exit side of said optical fiber rolls, the other of said two phase difference outputs being obtained by determining a phase difference between the reference light and composite phase-shifted light obtained by averaging output light from the optical fiber rolls of the force sensors provided for the other direction of said one of the three (X, Y and Z) axes at an exit side of said optical fiber rolls.

3. A three-component measuring seismometer comprising:
   a Z-direction accelerometer disposed such that two ends thereof face toward two opposite directions of a vertical (Z) axis of an orthogonal coordinate system having mutually perpendicular X-, Y- and Z-axes, said Z-direction accelerometer having a hollow rectangular prism-shaped load member and a solid rectangular prism-shaped load member disposed in an internal space of said hollow rectangular prism-shaped load member so as to be displaceable in a vertical longitudinal axis direction, said Z-direction accelerometer further having a stack of force sensors disposed to face each of two end surfaces in the displaceable direction of said solid rectangular prism-shaped load member, said force sensors each having a circular cylinder-shaped or meandrous optical fiber roll provided on a rigid plate, said optical fiber roll having light propagation characteristics which change in response to a change in pressure applied thereto, which is caused by relative displacement between said load members due to application of acceleration, thus causing a phase of light transmitted through said optical fiber roll to be shifted, and said optical fiber roll having a smaller elastic constant than those of said load members and rigid plate;

a pair of X-direction accelerometers for detecting acceleration in a horizontal X-axis direction, said X-direction accelerometers being disposed along a pair of opposite outer peripheral surfaces, respectively, of said Z-direction accelerometer to extend in said X-axis direction, and said X-direction accelerometers each having a hollow rectangular prism-shaped load member and a solid rectangular prism-shaped load member disposed in an internal space of said hollow rectangular prism-shaped load member so as to be displaceable in a horizontal longitudinal axis direction, said X-direction accelerometers further having a stack of force sensors disposed to face each of two end surfaces in the displaceable direction of said solid rectangular prism-shaped load member, said force sensors each having a circular cylinder-shaped or meandrous optical fiber roll provided on a rigid plate, said optical fiber roll having light propagation characteristics which change in response to a change in pressure applied thereto, which is caused by relative displacement between said load members due to application of acceleration, thus causing a phase of light transmitted through said optical fiber roll to be shifted, and said optical fiber roll having a smaller elastic constant than those of said load members and rigid plate;

a pair of Y-direction accelerometers for detecting acceleration in a horizontal Y-axis direction, said Y-direction accelerometers being disposed along a pair of opposite outer peripheral surfaces, respectively, of said Z-direction accelerometer to extend in said Y-axis direction, and said Y-direction accelerometers each having a hollow rectangular prism-shaped load member and a solid rectangular prism-shaped load member disposed in an internal space of said hollow rectangular prism-shaped load member so as to be displaceable in a horizontal longitudinal axis direction, said Y-direction accelerometers further having a stack of force sensors disposed to face each of two end surfaces in the displaceable direction of said solid rectangular prism-shaped load member, said force sensors each having a circular cylinder-shaped or meandrous optical fiber roll provided on a rigid plate, said optical fiber roll having light propagation characteristics which change in response to a change in pressure applied thereto, which is caused by relative displacement between said load members due to application of acceleration, thus causing a phase of light transmitted through said optical fiber roll to be shifted, and said optical fiber roll having a smaller elastic constant than those of said load members and rigid plate; and a data processing unit that calculates acceleration applied in the X-axis direction on the basis of a difference between two phase difference outputs, one of which is obtained by determining a phase difference between reference light and a recomposed value obtained by averaging two composite phase-shifted light each obtained by averaging output light from the optical fiber rolls of the force sensors provided to face one end surface of the solid rectangular prism-shaped load member of each of said pair of X-direction accelerometers at an exit side of said optical fiber rolls, the other of said two phase difference outputs being obtained by determining a phase difference between the reference light and a recomposed value obtained by averaging two composite phase-shifted light each obtained by averaging output light from the optical fiber rolls of the force sensors provided to face the other end surface of the solid rectangular prism-shaped load member of each of said pair of X-direction accelerometers at an exit side of said optical fiber rolls;

said data processing unit further calculating acceleration applied in the Y-axis direction on the basis of a difference between two phase difference outputs, one of which is obtained by determining a phase difference between the reference light and a recomposed value obtained by averaging two composite phase-shifted light each obtained by averaging output light from the optical fiber rolls of the force sensors provided to face one end surface of the solid rectangular prism-shaped load member of each of said pair of Y-direction accelerometers at an exit side of said optical fiber rolls, the other of said two phase difference outputs being obtained by determining a phase difference between the reference light and a recomposed value obtained by averaging two composite phase-shifted light each obtained by averaging output light from the optical fiber rolls of the force sensors provided to face the other end surface of the solid rectangular prism-shaped load member of each of said pair of Y-direction accelerometers at an exit side of said optical fiber rolls; and said data processing unit further calculating acceleration applied in the Z-axis direction on the basis of a difference between two phase difference outputs each obtained by determining a phase difference between the reference light and composite phase-shifted light obtained by averaging output light from the optical fiber rolls of the force sensors provided to face each of two end surfaces of the solid rectangular prism-shaped load member in said Z-direction accelerometer at an exit side of said optical fiber rolls.

4. A seismometer according to claim 2 or 3, which is accommodated in a container disposed at a bottom of a borehole dug in the ground, thereby eliminating an effect of temperature changes on said optical fiber rolls in said container.

5. A seismometer according to any one of claims 1 to 3, wherein said meandrous optical fiber roll is immersed in a viscous liquid filled in a bag member, so that when a pressure is externally applied toward said optical fiber roll through said bag member, said viscous liquid in said bag member applies uniform normal stress to an outer peripheral surface of said optical fiber roll while maintaining a hydrostatic pressure without applying (dynamic) shear stresses to said optical fiber roll, thereby uniformly reducing a sectional area of said optical fiber roll and converting a change in the applied pressure into a change in an axial length of said optical fiber roll.

6. A seismometer according to any one of claims 1 to 3, wherein said meandrous optical fiber roll is immersed in a viscous liquid filled in a bag member, so that when a pressure is externally applied toward said optical fiber roll through said bag member, said viscous liquid in said bag member applies uniform normal stress to an outer peripheral surface of said optical fiber roll while maintaining a hydrostatic pressure without applying (dynamic) shear stresses to said optical fiber roll, thereby uniformly reducing a sectional area of said optical fiber roll and converting a change in the applied pressure into a change in an axial length of said optical fiber roll, said optical fiber roll being defined as an optical fiber roll for measurement, and wherein an optical fiber roll through which said reference light passes is accommodated in a rigid tubular member to form a reference optical fiber roll, and said optical fiber roll for measurement and said reference optical fiber roll are paired and provided on said rigid plate in a side-by-side relation to each other.

7. A three-component seismometer comprising an accelerometer, said accelerometer including:

four planar plate-shaped optical fiber rolls each having an optical fiber winding whose light propagation characteristics change in response to a change in pressure applied thereto, said optical fiber winding being disposed to form a loop in a plane, said optical fiber rolls being divided and disposed in such manner that pairs of said divided optical fiber rolls face each other at opposite positions in each of the two orthogonal horizontal directions, and that four separate quadrants are formed between pairs of said divided optical fiber rolls; and a columnar or polygonal prism-shaped load member placed so that a bottom of said load member lies over a whole surface of each of said optical fiber rolls, wherein when an acceleration in a horizontal direction is applied to said load member, said load member tilts about a center of gravity G thereof, and an acceleration acting on said load member in a tilting direction of said load member is obtained on the basis of an amount of change of output light from each of the optical fiber rolls provided to face each other in said tilting direction, and when an acceleration in a vertical direction is applied to said load member, said load member is displaced relatively in the vertical direction, and an acceleration acting on said load member in the vertical direction is obtained on the basis of a same amount of change of output light from each of said four optical fiber rolls.

8. A three-component seismometer, comprising:

a quadrangular prism-shaped load member;

optical fiber rolls each having an optical fiber winding whose light propagation characteristics change in response to a change in pressure applied thereto, said optical fiber winding being disposed in a loop shape in a plane, said optical fiber rolls being disposed so that a whole surface of each optical fiber roll faces opposite to each of six surfaces of said load member; and pressure plates each provided at a back of each of said optical fiber rolls to apply a predetermined bias pressure to the optical fiber roll, wherein said load member is held by said pressure plates with said optical fiber rolls interposed therebetween, and when an acceleration in a horizontal or vertical direction is applied to said load member, said load member is displaced in said horizontal or vertical direction, and a change in acceleration acting on said load member is measured on the basis of a difference between the light propagation characteristics of a pair of said optical fiber rolls that are provided to face each other in a direction in which said load member is displaced.

* * * * *